United States Patent
Kawamura et al.

(10) Patent No.: US 10,599,365 B2
(45) Date of Patent: Mar. 24, 2020

(54) STORAGE SYSTEM

(71) Applicant: Toshiba Memory Corporation, Minato-ku (JP)

(72) Inventors: Kazunari Kawamura, Akishima (JP); Takahiro Kurita, Sagamihara (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/114,746

(22) Filed: Aug. 28, 2018

(65) Prior Publication Data
US 2019/0294366 A1 Sep. 26, 2019

(30) Foreign Application Priority Data

Mar. 20, 2018 (JP) .................. 2018-053280

(51) Int. Cl.
*G06F 3/06* (2006.01)
*G06F 12/02* (2006.01)
*G06F 9/48* (2006.01)

(52) U.S. Cl.
CPC ............ *G06F 3/0659* (2013.01); *G06F 3/061* (2013.01); *G06F 3/0688* (2013.01); *G06F 9/4881* (2013.01); *G06F 12/0246* (2013.01)

(58) Field of Classification Search
CPC .... G06F 3/0659; G06F 3/061; G06F 12/0246; G06F 3/0688; G06F 9/4881
USPC ........................................................ 711/154
See application file for complete search history.

(56) References Cited

U.S. PATENT DOCUMENTS

| 6,317,804 | B1 | 11/2001 | Levy et al. |
| 7,752,419 | B1 | 7/2010 | Plunkett et al. |
| 9,042,380 | B2 | 5/2015 | Szymanski |
| 2002/0138716 | A1 | 9/2002 | Master et al. |
| 2003/0054774 | A1 | 3/2003 | Plunkett et al. |
| 2003/0135743 | A1 | 7/2003 | Scheuermann |
| 2003/0154357 | A1 | 8/2003 | Master et al. |
| 2004/0008640 | A1 | 1/2004 | Heidari et al. |
| 2004/0010645 | A1 | 1/2004 | Scheuermann et al. |
| 2004/0025159 | A1 | 2/2004 | Scheuermann et al. |

(Continued)

FOREIGN PATENT DOCUMENTS

| JP | 2002-531891 | 9/2002 |
| JP | 2013-518327 | 5/2013 |
| JP | 2016-535904 | 11/2016 |

OTHER PUBLICATIONS

NVM Express, Inc., "NVM Express over Fabrics", (Revision 1.0), Jun. 2016, pp. 49.

*Primary Examiner* — Hua J Song
(74) *Attorney, Agent, or Firm* — Oblon, McClelland, Maier & Neustadt, L.L.P.

(57) ABSTRACT

According to one embodiment, a storage system comprises storages includes a first storage and a second storage, controllers connected to the storages and includes a first controller connected to the first storage, and packet transfer units connected to the controllers and includes a first packet transfer unit. When first data is read from the second storage, the first controller reserves a region for receiving first packets includes the first data in a memory, places a command for receiving the first packets in a first queue of the first packet transfer unit, stores a second packet for requesting sending of the first data in the memory, and places a command for sending the second packet in the first queue.

13 Claims, 27 Drawing Sheets

(56) References Cited

U.S. PATENT DOCUMENTS

| | | |
|---|---|---|
| 2004/0030736 A1 | 2/2004 | Scheuermann |
| 2004/0093465 A1 | 5/2004 | Ramchandran |
| 2004/0093479 A1 | 5/2004 | Ramchandran |
| 2004/0133745 A1 | 7/2004 | Ramchandran |
| 2004/0168044 A1 | 8/2004 | Ramchandran |
| 2004/0181614 A1 | 9/2004 | Furtek et al. |
| 2009/0161863 A1 | 6/2009 | Scheuermann |
| 2010/0293356 A1 | 11/2010 | Plunkett et al. |
| 2010/0306387 A1* | 12/2010 | Ajima ............... H04L 67/14 709/227 |
| 2011/0179252 A1 | 7/2011 | Master et al. |
| 2012/0026868 A1 | 2/2012 | Chang et al. |
| 2012/0036514 A1 | 2/2012 | Master et al. |
| 2013/0151793 A1 | 6/2013 | Rudosky et al. |
| 2015/0063355 A1 | 3/2015 | Makhervaks et al. |
| 2015/0063356 A1 | 3/2015 | Makhervaks et al. |
| 2015/0067020 A1 | 3/2015 | Makhervaks et al. |
| 2015/0067191 A1 | 3/2015 | Makhervaks et al. |

* cited by examiner

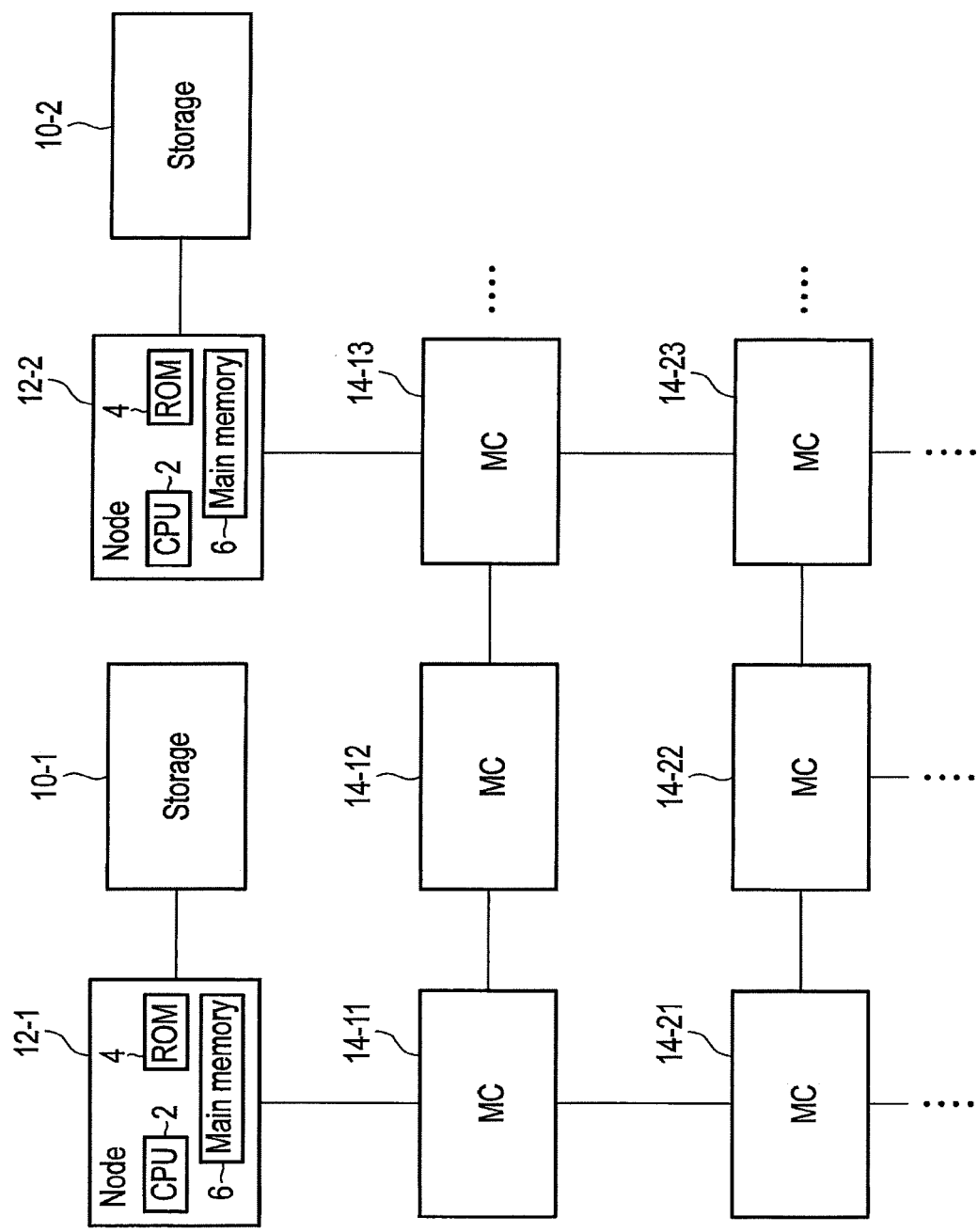
F I G. 1

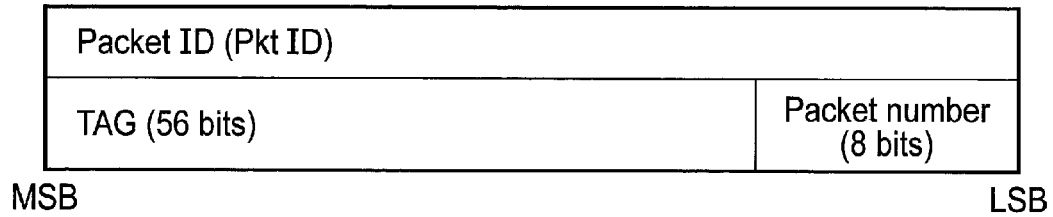
F I G. 3
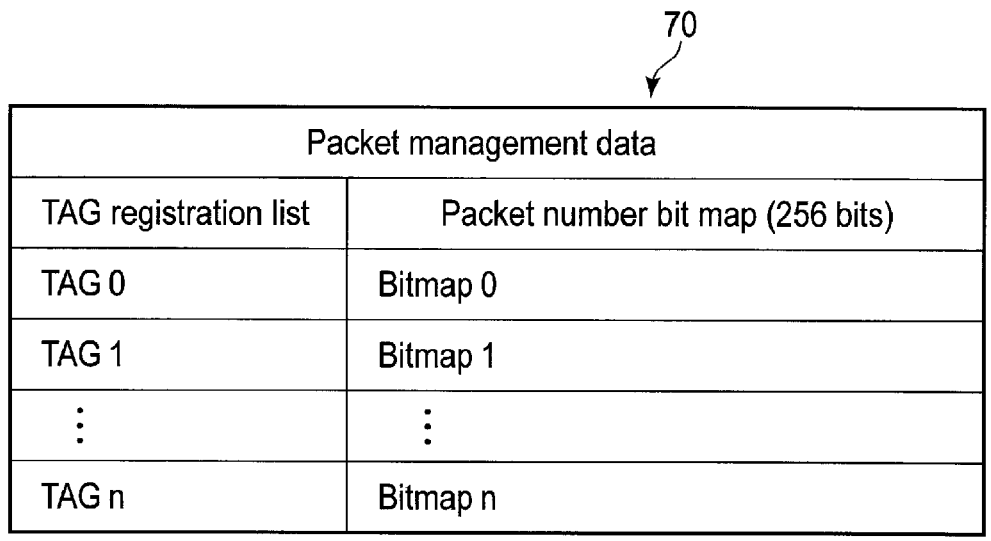
F I G. 4

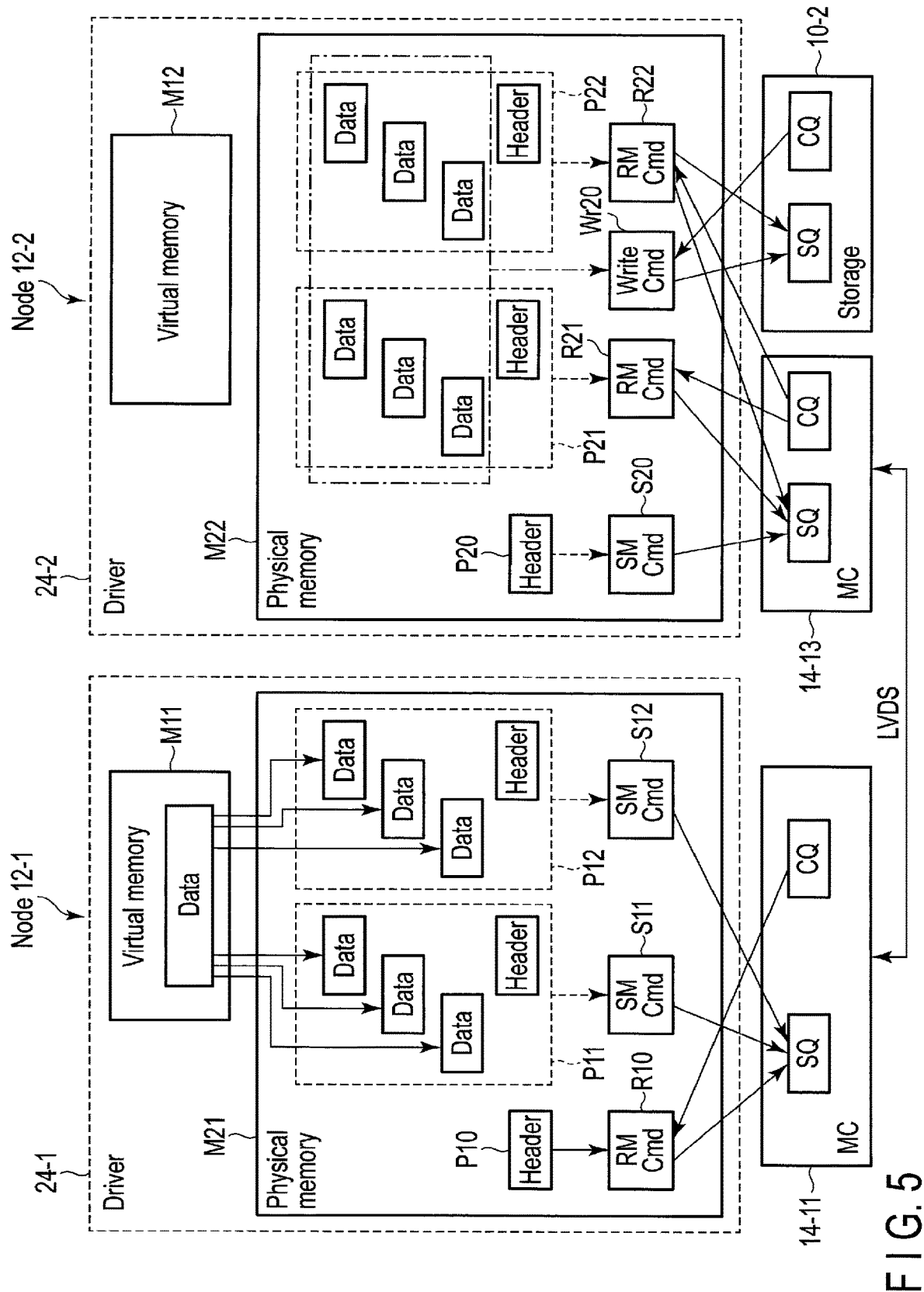
F I G. 5

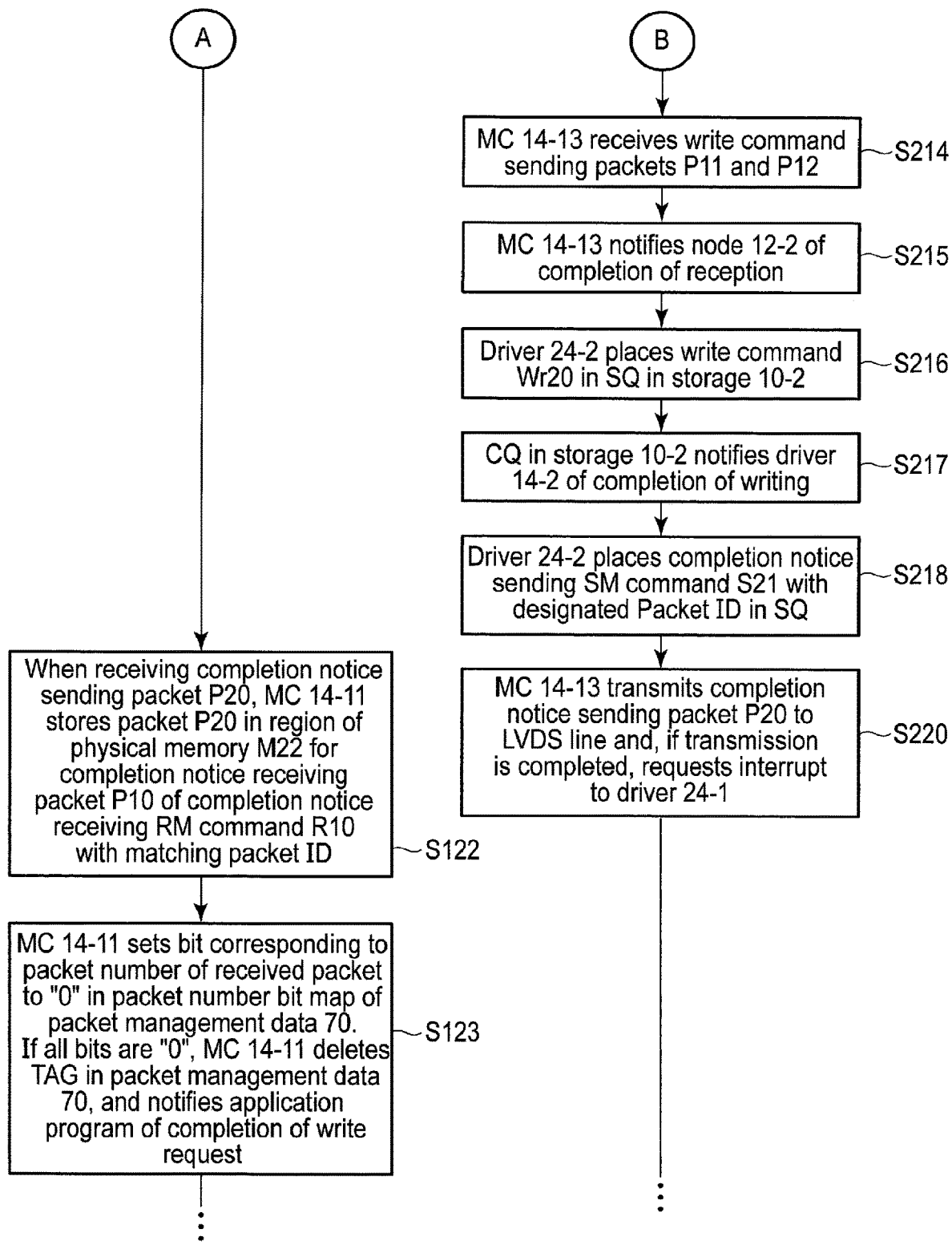
F I G. 7A   F I G. 7B

Completion notice receiving packet P10

| Header region (empty) |

FIG. 8A

Completion notice receiving RM command R10

| Bytes | Description | |
|---|---|---|
| 03:00 | Command Dword 0 (CDW0) | Receive Message |
| 07:04 | Namespace Identifier (NSID) | Undefined |
| 15:08 | Reserved | Reserved |
| 23:16 | Metadata Pointer (MPTR) | SGL Descriptor0 |
| 31:24 | Data Pointer (DPTR) | |
| 39:32 | Data Pointer (DPTR) | Reserved |
| 43:40 | Command Dword 10 (CDW10) | Packet ID of completion notice receiving packet P10 |
| 47:44 | Command Dword 11 (CDW11) | |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

FIG. 8B

Write command sending packets P11 and P12

| Header region | | | | Payload |
|---|---|---|---|---|
| Write command information | Packet identification information | Packet ID (Wildcard) | Packet ID of completion notice receiving packet | Write data |

F I G. 9A

Write command sending SM commands S11 and S12

| Bytes | Description | |
|---|---|---|
| 03:00 | Command Dword 0 (CDW0) | Send Message |
| 07:04 | Namespace Identifier (NSID) | Undefined |
| 15:08 | Reserved | Reserved |
| 23:16 | Metadata Pointer (MPTR) | SGL Segment Descriptor |
| 31:24 | Data Pointer (DPTR) | |
| 39:32 | Data Pointer (DPTR) | Reserved |
| 43:40 | Command Dword 10 (CDW10) | Reserved |
| 47:44 | Command Dword 11 (CDW11) | Reserved |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

F I G. 9B

Reception packets P21 and P22

| Header region (empty) | Payload | |
|---|---|---|
| | Payload header (empty) | Payload data (empty) |

FIG. 10A

Reception-packet receiving RM commands R21 and R22

| Bytes | Description | |
|---|---|---|
| 03:00 | Command Dword 0 (CDW0) | Receive Message |
| 07:04 | Namespace Identifier (NSID) | Undefined |
| 15:08 | Reserved | Reserved |
| 23:16 | Metadata Pointer (MPTR) | SGL Segment Descriptor |
| 31:24 | Data Pointer (DPTR) | |
| 39:32 | Data Pointer (DPTR) | Reserved |
| 43:40 | Command Dword 10 (CDW10) | Packet ID (Wildcard) |
| 47:44 | Command Dword 11 (CDW11) | |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

FIG. 10B

Completion notice sending packet P20

| Header region ||
|---|---|
| Write command result | Packet ID of completion notice sending packet |

FIG. 11A

Completion notice sending SM command S20

| Bytes | Description | |
|---|---|---|
| 03:00 | Command Dword 0 (CDW0) | Send Message |
| 07:04 | Namespace Identifier (NSID) | Undefined |
| 15:08 | Reserved | Reserved |
| 23:16 | Metadata Pointer (MPTR) | SGL Descriptor0 |
| 31:24 | Data Pointer (DPTR) | |
| 39:32 | Data Pointer (DPTR) | Reserved |
| 43:40 | Command Dword 10 (CDW10) | Reserved |
| 47:44 | Command Dword 11 (CDW11) | Reserved |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

FIG. 11B

| Opcode by Field | | | Combined Opcode | O/M | Command |
|---|---|---|---|---|---|
| 07 | 06:02 | 01:00 | | | |
| Standard Command | Function | Data Transfer | | | |
| 0b | 000 00b | 00b | 00h | M | Flush |
| 0b | 000 00b | 01b | 01h | M | Write |
| 0b | 000 00b | 10b | 02h | M | Read |
| 0b | 000 01b | 00b | 04h | O | Write uncorrectable |
| 0b | 000 01b | 01b | 05h | O | Compare |
| 0b | 000 10b | 00b | 08h | O | Write Zeros |
| 0b | 000 10b | 01b | 09h | O | Dataset Management |
| 0b | 000 11b | 01b | 0Dh | O | Reservation Register |
| 0b | 000 11b | 10b | 0Eh | O | Reservation Report |
| 0b | 001 00b | 01b | 11h | O | Reservation Acquire |
| 0b | 001 01b | 01b | 05h | O | Reservation Release |
| Vendor Specific | | | | | |
| 1b | 000 00b | 01b | 81h | O | Send Message |
| 1b | 000 00b | 10b | 82h | O | Receive Message |

F I G. 12

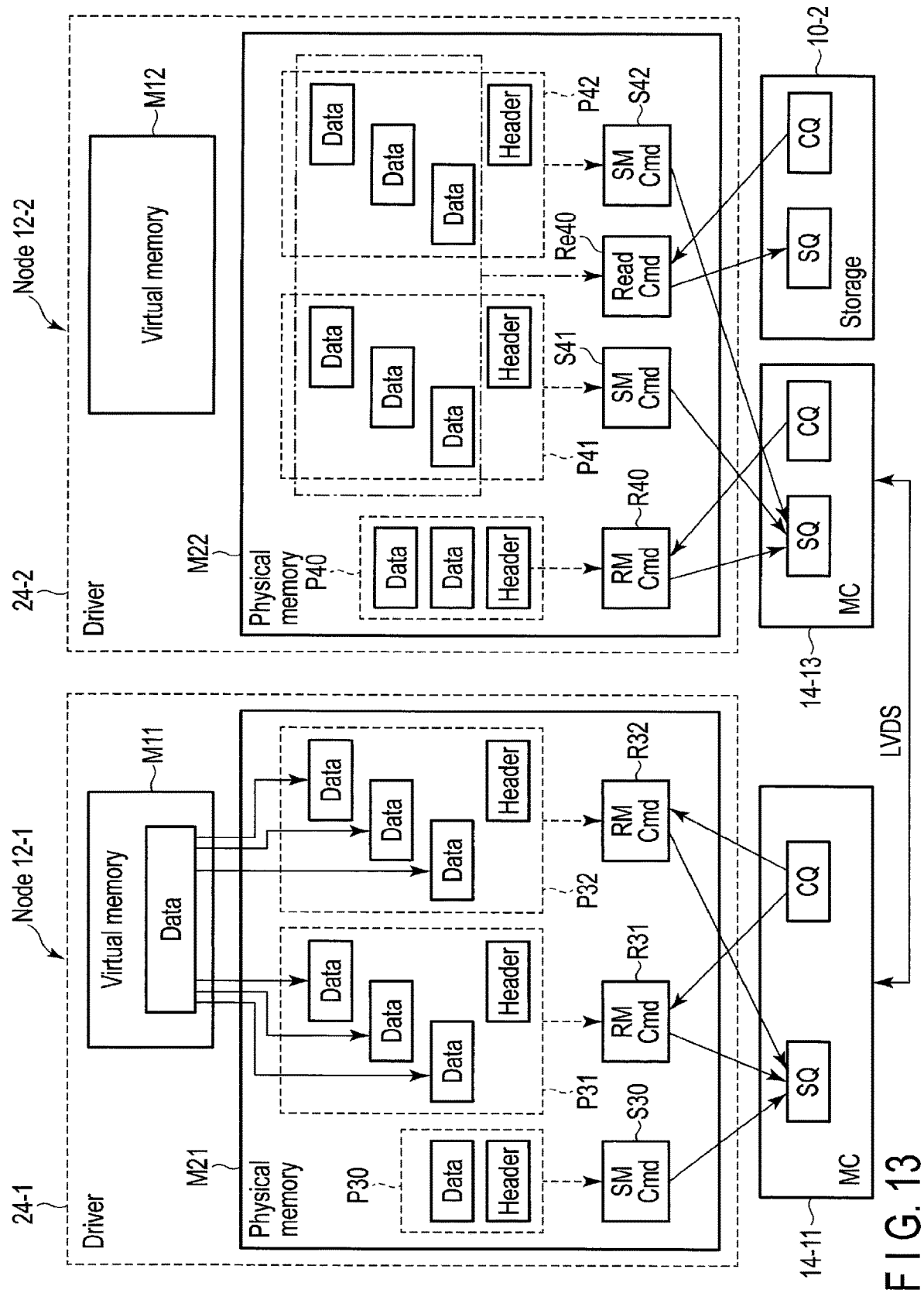
F I G. 13

Read data receiving packets P31 and P32

| Header region (empty) | Payload |
| --- | --- |
|  | Read data (empty) |

F I G. 16A

Read data receiving RM commands R31 and R32

| Bytes | Description | |
| --- | --- | --- |
| 03:00 | Command Dword 0 (CDW0) | Receive Message |
| 07:04 | Namespace Identifier (NSID) | Undefined |
| 15:08 | Reserved | Reserved |
| 23:16 | Metadata Pointer (MPTR) | SGL Segment Descriptor |
| 31:24 | Data Pointer (DPTR) | |
| 39:32 | Data Pointer (DPTR) | Reserved |
| 43:40 | Command Dword 10 (CDW10) | PktIDxx |
| 47:44 | Command Dword 11 (CDW11) | |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

F I G. 16B

Read command sending packet P30

| Header region | | | Payload | | | | | |
|---|---|---|---|---|---|---|---|---|
| Read command information | Packet identification information | Packet ID (Wildcard) | Number of reception Packet IDs | Reception Packet ID1 | Data length of Packet ID1 | Reception Packet ID2 | Data length of Packet ID2 | ... |

F I G. 17A

Read command sending SM command S30

| Bytes | Description | |
|---|---|---|
| 03:00 | Command Dword 0 (CDW0) | Send Message |
| 07:04 | Namespace Identifier (NSID) | Undefined |
| 15:08 | Reserved | Reserved |
| 23:16 | Metadata Pointer (MPTR) | SGL Segment Descriptor |
| 31:24 | Data Pointer (DPTR) | |
| 39:32 | Data Pointer (DPTR) | Reserved |
| 43:40 | Command Dword 10 (CDW10) | Reserved |
| 47:44 | Command Dword 11 (CDW11) | Reserved |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

F I G. 17B

Reception packet P40

| Header region (empty) | Payload ||
|---|---|---|
| | Payload header (empty) | Payload data (empty) |

FIG. 18A

Packet receiving RM command R40

| Bytes | Description | |
|---|---|---|
| 03:00 | Command Dword 0 (CDW0) | Receive Message |
| 07:04 | Namespace Identifier (NSID) | Undefined |
| 15:08 | Reserved | Reserved |
| 23:16 | Metadata Pointer (MPTR) | SGL Segment Descriptor |
| 31:24 | Data Pointer (DPTR) | |
| 39:32 | Data Pointer (DPTR) | Reserved |
| 43:40 | Command Dword 10 (CDW10) | Packet ID (Wildcard) |
| 47:44 | Command Dword 11 (CDW11) | |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

FIG. 18B

Read data sending packets P41 and P42

| Header information | | | Payload |
|---|---|---|---|
| Read command information | Packet identification information | Packet IDxx | Read data |

FIG. 19A

Read data sending SM commands S41 and S42

| Bytes | Description | |
|---|---|---|
| 03:00 | Command Dword 0 (CDW0) | Send Message |
| 07:04 | Namespace Identifier (NSID) | Undefined |
| 15:08 | Reserved | Reserved |
| 23:16 | Metadata Pointer (MPTR) | SGL Segment Descriptor |
| 31:24 | Data Pointer (DPTR) | |
| 39:32 | Data Pointer (DPTR) | Reserved |
| 43:40 | Command Dword 10 (CDW10) | Reserved |
| 47:44 | Command Dword 11 (CDW11) | Reserved |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

FIG. 19B

Slot reserve command (Wildcard)

| Bytes | Description | |
|---|---|---|
| 03:00 | Command Dword 0 (CDW0) | Wildcard |
| 07:04 | Namespace Identifier (NSID) | 0 |
| 15:08 | Reserved | Reserved |
| 23:16 | Metadata Pointer (MPTR) | SGL (for Header) |
| 31:24 | Data Pointer (DPTR) | SGL (for Data) |
| 39:32 | Data Pointer (DPTR) | Reserved |
| 43:40 | Command Dword 10 (CDW10) | Reserved |
| 47:44 | Command Dword 11 (CDW11) | Reserved |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

F I G. 20

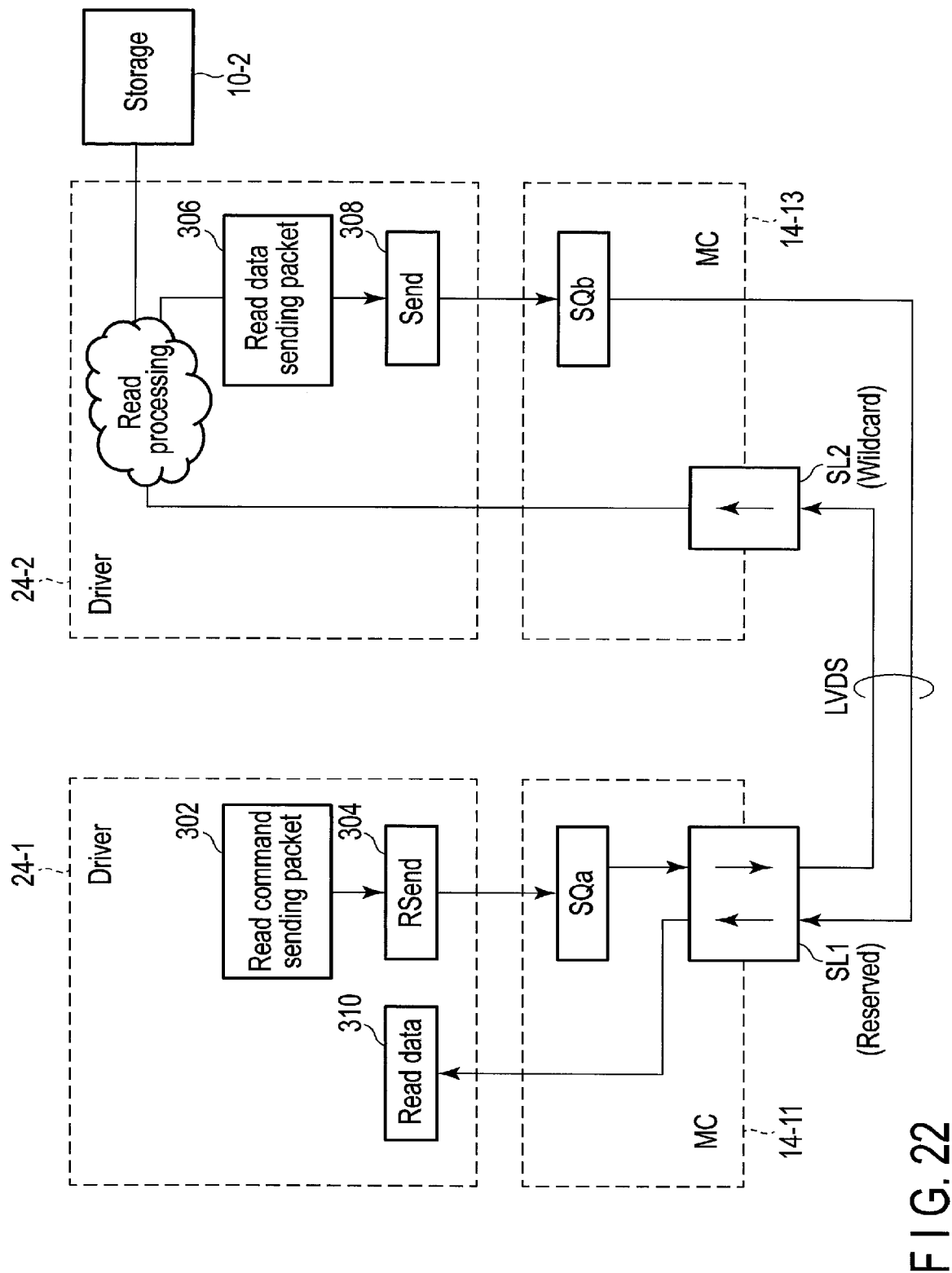
F I G. 22

Read command sending packet 302

| Header region | Transmission destination node address (node 12-2) |
| --- | --- |
| | Transmission source slot ID (reserved slot SL1) |
| | Transmission destination slot ID (wildcard slot) |
| | Packet information |
| | Packet ID |
| | Command information |
| | ... |
| Payload | (Empty) |

F I G. 23

Slot-reserving/sending command (RSend)

| Bytes | Description | |
|---|---|---|
| 03:00 | Command Dword 0 (CDW0) | Reserve Send |
| 07:04 | Namespace Identifier (NSID) | 0 |
| 15:08 | Reserved | Reserved |
| 23:16 | Metadata Pointer (MPTR) | SGL (for Header) |
| 31:24 | Data Pointer (DPTR) | SGL (for Sending Data) |
| 39:32 | Data Pointer (DPTR) | SGL (for Receiving Data) |
| 43:40 | Command Dword 10 (CDW10) | Number of sending packets |
| 47:44 | Command Dword 11 (CDW11) | Number of receiving packets |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

F I G. 24

Read data sending packet 306

| Header region | Transmission destination node address (node 12-1) |
| --- | --- |
| | Transmission source slot ID  (unused) |
| | Transmission destination slot ID  (reserved slot SL1) |
| | Packet information |
| | Packet ID |
| | Command information |
| | ... |
| Payload | Read data |

F I G. 25

Sending command Send without reserving a slot

| Bytes | Description | |
|---|---|---|
| 03:00 | Command Dword 0 (CDW0) | Send |
| 07:04 | Namespace Identifier (NSID) | 0 |
| 15:08 | Reserved | Reserved |
| 23:16 | Metadata Pointer (MPTR) | SGL (for Header) |
| 31:24 | Data Pointer (DPTR) | SGL (for Data) |
| 39:32 | Data Pointer (DPTR) | Reserved |
| 43:40 | Command Dword 10 (CDW10) | Number of sending packets |
| 47:44 | Command Dword 11 (CDW11) | Reserved |
| 51:48 | Command Dword 12 (CDW12) | Reserved |
| 55:52 | Command Dword 13 (CDW13) | Reserved |
| 59:56 | Command Dword 14 (CDW14) | Reserved |
| 63:60 | Command Dword 15 (CDW15) | Reserved |

F I G. 26

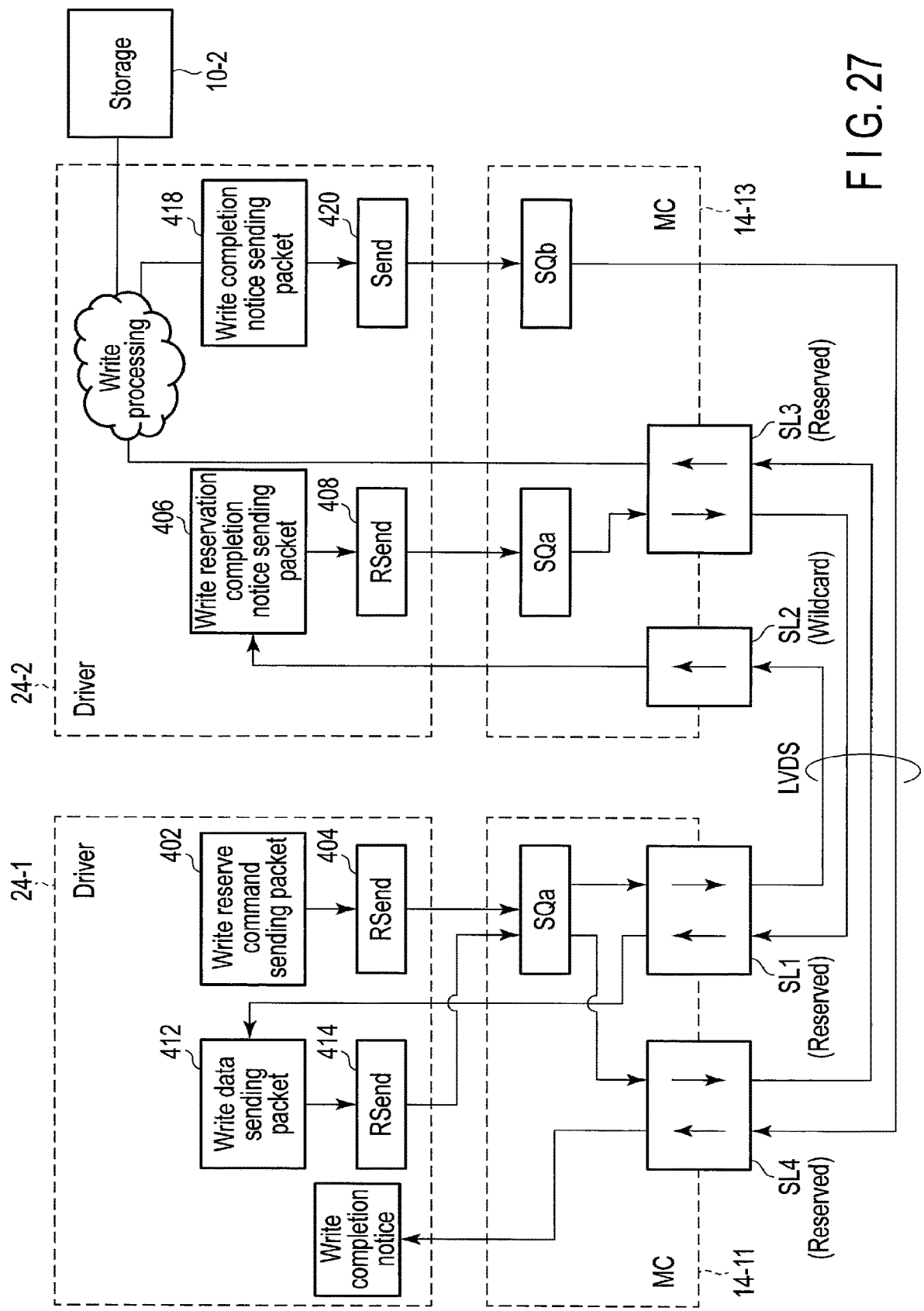
F I G. 27

STORAGE SYSTEM

CROSS-REFERENCE TO RELATED APPLICATIONS

This application is based upon and claims the benefit of priority from Japanese Patent Application No. 2018-053280, filed Mar. 20, 2018, the entire contents of which are incorporated herein by reference.

FIELD

Embodiments described herein relate generally to a storage system.

BACKGROUND

A storage system having plural storages which include nonvolatile memories such as flash memories has been developed.

In a conventional storage system, plural storages constitute a network. Plural storages include a first storage and a second storage. An efficiency of writing the data to the second storage by the first storage and/or reading the data from the second storage by the first storage is susceptible of improvement.

BRIEF DESCRIPTION OF THE DRAWINGS

FIG. 1 is a block diagram showing an example of configuration of an overall storage system according to the first embodiment.

FIG. 3 is a table showing an example of packet ID.

FIG. 4 is a table showing an example of packet management data 70.

FIG. 5 is a diagram showing an example of packet transfer in the first write processing in which the driver 24 of the first node 12-1 writes data to a storage 10-2 of the second node 12-2.

FIG. 7A and FIG. 7B are flowcharts showing a latter half of the example of the first write processing.

FIG. 8A and FIG. 8B are tables showing examples of a completion notice receiving packet P10 and a completion notice receiving RM command R10.

FIG. 9A and FIG. 9B are tables showing examples of write command sending packets P11 and P12, and write command sending SM commands S11 and S12.

FIG. 10A and FIG. 10B are tables showing examples of reception packets P21 and P22, and reception-packet receiving RM commands R21 and R22.

FIG. 11A and FIG. 11B are tables showing examples of a completion notice sending packet P20 and a completion notice sending SM command S20.

FIG. 12 is a table showing examples of operation codes of the SM command and the RM command.

FIG. 13 is a diagram showing an example of packet transfer in the first read processing in which the driver of the first node reads data from the storage of the second node.

FIG. 16A and FIG. 16B are tables showing examples of read data receiving packets P31 and P32 and read data receiving RM commands R31 and R32.

FIG. 17A and FIG. 17B are tables showing examples of a read command sending packet P30 and a read command sending SM command S30.

FIG. 18A and FIG. 18B are tables showing examples of a reception packet P40 and a packet receiving RM command R40.

FIG. 19A and FIG. 19B are tables showing examples of read data sending packets P41 and P42, and read data sending SM commands S41 and S42.

FIG. 20 is a table showing examples of a slot reserve command (Wildcard) in the second read/write processing.

FIG. 22 is a diagram showing an example of packet transfer in the second read processing in which the driver 24-1 reads data from the storage 10-2 of the driver 24-2.

FIG. 23 is a table showing an example of a read command sending packet 302 in the second read processing.

FIG. 24 is a table showing an example of a slot-reserving/sending command RSend for sending the read command sending packet 302 after reserving a slot in the second read processing.

FIG. 25 is a table showing an example of a read data sending packet 306 in the second read processing.

FIG. 26 is a table showing an example of a sending command Send for sending the read data sending packet 306 without reserving a slot in the second read processing.

FIG. 27 is a diagram showing an example of packet transfer in the second write processing in which the driver 24-1 writes data to the storage 10-2 of the driver 24-2.

DETAILED DESCRIPTION

Figure 2A:
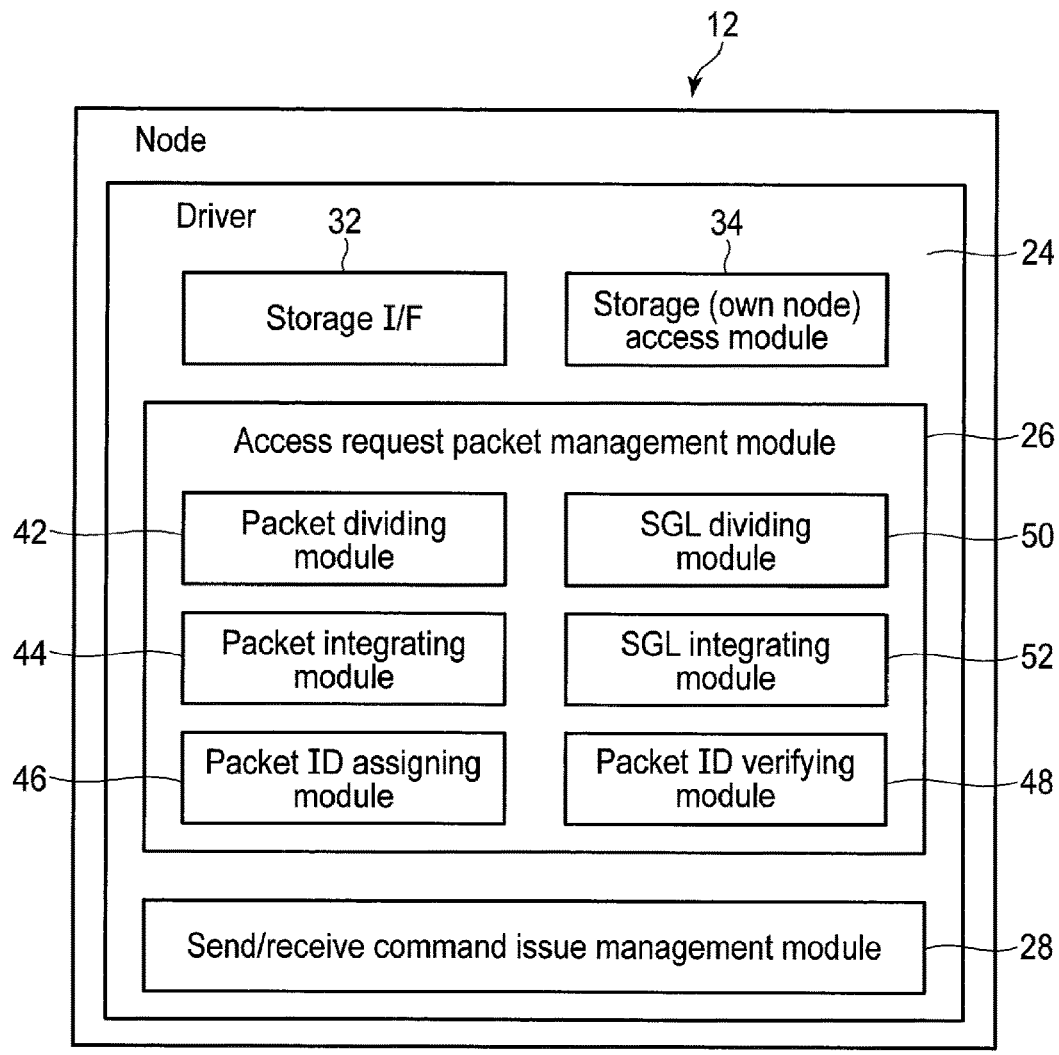
FIG. 2A and FIG. 2B are block diagrams showing an example of a node 12 and a matrix controller 14 in the storage system.

Various embodiments will be described hereinafter with reference to the accompanying drawings. The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a storage system comprises plural storages comprising a first storage and a second storage; plural controllers connected to the plural storages, the plural controllers comprising a first controller connected to the first storage; and plural packet transfer units connected to the plural controllers, the plural packet transfer units comprising a first packet transfer unit. When first data is read from the second storage, the first controller is configured to reserve a region for receiving plural first packets in a memory, the plural first packets comprising the first data, place a first command for receiving the plural first packets in a first queue of the first packet transfer unit, store a second packet for requesting sending of the first data in the memory, and place a second command for sending the second packet in the first queue. When the first command is received and all of the plural first packets are received, the first packet transfer unit is configured to place a completion notice of the first command in a second queue of the first packet transfer unit. When the second command is received and sending of the second packet is completed, the first packet transfer unit is configured to place a completion notice of the second command in the second queue.

[Overall Configuration of Storage System]

FIG. 1 is a block diagram showing an example of a configuration of an overall storage system according to the embodiments. Plural storages 10-1, 10-2 . . . (often generically called a storage 10) are connected to plural nodes 12-1, 12-2 . . . (generically called a node 12), respectively. The storage 10 is, for example, a solid state drive (SSD) including nonvolatile semiconductor memories such as flash memories. The node 12 executes read/write processing for the storage 10 and includes a ROM 4 which stores a program, a CPU 2 which executes the program, and a main memory 6 such as a DRAM which temporarily stores the data for the program.

Plural matrix controllers (hereinafter called MCs) 14-1, 14-2, 14-3 . . . (generally called an MC 14) are connected to constitute a network. One of examples of the network is a meshed network in which MC 14 is connected to plural MCs via, for example, signal lines according to Low Voltage Differential Signaling (LVDS) standard. The node 12 is connected to any one of MCs 14. The MC 14 has a routing function of transferring a packet from the node 12 to any one of MCs 14. In other words, the packet transferred from a node 12-1 is transferred to a node 12-2 via plural MCs 14. The nodes 12 can thereby share plural storages 10.

As an interface for interconnection between the node 12 and the storage 10, Small Computer System Interface (SCSI) (registered trademark), Serial Attached SCSI (SAS) (registered trademark), Advanced Technology Attachment (ATA) (registered trademark), Serial ATA (SATA) (registered trademark), PCI Express (PCIe) (registered trademark), NVM Express (also called NVMe) (registered trademark), Ethernet (registered trademark), Fibre channel (registered trademark), and the like can be used. In the embodiments, packets are transmitted in accordance with NVMe interface between the node 12 and the storage 10, between the node 12 and the MC 14, and between adjacent MCs 14.

Figure 2B:
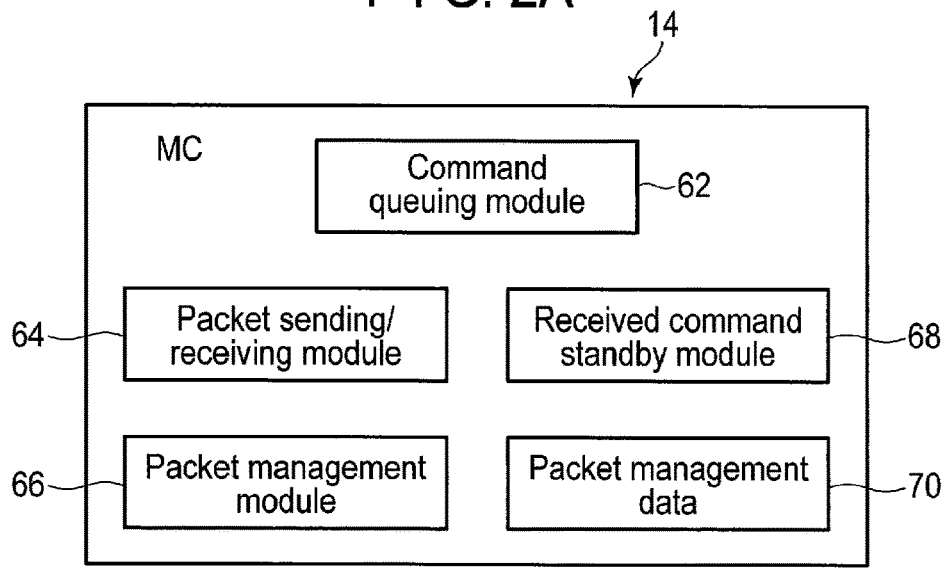

FIG. 2A and FIG. 2B are block diagrams showing examples of the functional blocks of the node 12 and MC 14. As shown in FIG. 2A, the node 12 includes a driver 24. The driver 24 includes a storage I/F 32, a storage (own node) access module 34, an access request packet management module 26, and a send/receive command issue management module 28. The access request packet management module 26 includes a packet dividing module 42, a packet integrating module 44, a packet ID assigning module 46, a packet ID verifying module 48, a scatter gather list (SGL) dividing module 50, and an SGL integrating module 52. The modules included in the driver 24 of the node 12 are implemented by software executed by the CPU 2.

The storage I/F 32 provides an interface (for example, a device file on the OS) necessary for an upper layer such as a file system to access the storage 10. The storage I/F 32 can provide the storage 10 of the own node and the storage 10 of the other node in the same address space or independent address spaces. The storage I/F 32 can execute address translation from the provided address space into the address space on the storage 10 of the own node and the storage 10 of the other node if necessary.

The storage (own node) access module 34 accesses the storage 10 of the own node when receiving an access request to the region in the address space mapped to the storage 10 of the own node by the storage I/F 32.

When receiving an access request to the region in the address space mapped to the storage 10 of the other node by the storage I/F 32, the access request packet management module 26 translates the access request into a packet, sends the packet to the other node, and translates a response packet from the other node into a response to the access request. Furthermore, the access request packet management module 26 translates a request packet transferred from the other node into a storage access request of the own node, executes the storage access request using the storage (own node) access module 34, and returns the response packet to the other node.

If a data transfer amount concerning the access request to the storage 10 of the other node is not included in a single packet, the packet dividing module 42 divides the access request into plural packets and then sends the plural packets. The packet integrating module 44 at the transfer destination combines the divided plural packets indicative of the access request into the single original access request.

The packet ID assigning module 46 is provided for packet division and the packet ID verifying module 48 is provided for packet integration. The packet ID is used to associate the request with the packet and is a number unique to the packet to identify the packet as an authenticated packet.

The packet ID assigning module 46 allocates the packet ID to a reception packet when preparing the packet. When receiving the packet, the packet ID verifying module 48 determines whether the received packet is an authenticated packet or not, based on the packet ID.

FIG. 3 shows an example of the packet ID (also called PktID). The packet ID includes, for example, 64 bits, and high-order 56 bits are indicative of TAG and lower-order 8 bits are indicative of a packet number. TAG is indicative of a set of packet IDs. The packet number is indicative of order of the packet ID in a set of packet IDs identified by TAG.

The SGL dividing module 50 divides SGL into plural SGLs for respective packets when dividing one packet into plural packets. SGL is a list of pointers and sizes of regions of data (including packet headers) disposed discontinuously in the main memory (physical address region) arranged in a transmitting or receiving sequence. The SGL integrating module 52 integrates plural SGL into one SGL when integrating plural packets to restore a single original access request.

The send/receive command issue management module 28 places a command for receiving the reception packet in a submission queue (SQ), confirms completion of the send command by polling completion queue (CQ), and processes a reception completion command after receiving an interruption. The command for receiving the reception packet includes a packet ID which is a wildcard. In NVMe system, a circular queue having a fixed entry size is used to notify messages (commands and command completion notice). The queue includes the SQ and the CQ. The queue may be stored anywhere, but the SQ and the CQ used for packet transfer between nodes are assumed to be provided in the MC 14. The SQ is used to issue a command from the node 12 to the MC 14. The CQ is used to notify the node 12 that the command is completed, by the MC 14. Examples of the command include a command to send the packet (SM command to be explained below) and a command to receive the packet (RM command).

As shown in FIG. 2B, the MC 14 includes a command queuing module 62, a packet sending/receiving module 64, a packet management module 66, and a received command standby module 68, and stores packet management data 70. Each of modules of the MC 14 is implemented by hardware.

The command queuing module 62 places a job for a send/receive command issued by the node 12, in the SQ, and places a job for the completed send/receive command, in the CQ.

The packet sending/receiving module 64 sends the packet issued by the send command to an adjacent MC 14, determines whether the packet from the adjacent MC 14 is the packet for own MC or the packet for the other MC, sends the packet for the other MC to the other MC 14, determines whether the packet is for the own MC using the packet management module 66, and receives the packet for the own MC in a region in the memory space on the node 12 which is defined by the receive command.

The received command standby module 68 stores the received command set by the node 12 until an appropriate packet reaches. The stored command can be canceled by instructions from an application program or the like executed by the CPU 2 of the node 12.

The packet management module 66 manages status of the received packet by using the packet management data 70 shown in FIG. 4. The management of the status of the received packet includes registration of packet numbers to a packet number bit map of the packet management data 70, deletion of the packet numbers in the packet number bit map, and the like. The packet management module 66 requests an interrupt to the node 12 at an appropriate timing, in cooperation with the other modules.

The packet management data 70 is indicative of the status of the received packet stored in a packet management structure. FIG. 4 shows an example of the packet management data 70. The packet management data 70 is indicative of the bit map (256 bits) of the packet numbers for each TAG. When receiving an RM command (explained below) from the own node, the packet management module 66 checks whether a TAG in the packet ID included in the command is registered in the packet management data 70 or not. If the TAG is unregistered, the packet management module 66 registers the TAG in the packet management data 70 and sets the bit corresponding to the packet number of the packet number bit map to "1". However, if the packet ID included in the RM command is a wildcard, the packet management module 66 does not register the TAG.

When receiving the packet indicative of an RM command from the other node, the packet management module 66 sends the data to a memory region specified by the RM command. When completing the sending, the packet management module 66 places a completion notice in the CQ and sets the bit corresponding to the packet number of the packet number bit map in the packet management data 70 to "0". When all of the bits of the packet number bit map corresponding to one TAG become "0", the packet management module 66 deletes the TAG in the list and generates an interrupt. If no TAG is registered, the packet management module 66 generates an interrupt immediately. Thus, the command queuing module 62 does not generates an interrupt even when one receive command is completed, but generates an interrupt when all of the receive commands relating to one send command are completed, and notifies the application program executed by the CPU 2 of the completion of send/receive command. For this reason, an interrupt is not generated every time the packet is received, but an interrupt is generated when all of the packets relating to the RM command are received. Thus, a generation frequency of an interrupt is lowered and the transfer efficiency is improved.

[First Read/Write Processing]

The storage device of the embodiment can improve an efficiency of reading/writing the data of the first node from/to a storage connected to the second node. The read/write efficiency responds to the number of times of copying the data by the CPU 2 of the node 12 and the number of times of interrupting the CPU 2 of the node 12 by the MC 14.

The CPU 2 of the node 12 locates the data at predetermined positions, arranges the data in a predetermined order, and attaches a routing address such as an address of the node of the transfer destination or a cyclic redundancy code (CRC) for error correction to the packet when creating the packet. The data needs to be temporarily copied to the other location in the main memory 6 (physical address region). Load of the copy processing reduces data read/write efficiency.

When creating the packet, however, the node 12 of the embodiment associates a header in the main memory 6 (physical address region) with the data by using SGL. For this reason, data copy in the main memory 6 (physical address region) is unnecessary, and the read/write efficiency is improved.

In addition, the MC 14 receives the packet including the data requested by the command sent to the other MC. If the data size is large, plural packets are received for one command. Every time the MC 14 completes receiving the packets, the MC 14 may send the completion notice to the node 12. If the node 12 receives the completion notice, the read/write efficiency is lowered since the CPU 2 is interrupted. In the embodiment, however, the MC 14 does not send the completion notice to the node 12 until receiving all data concerning one command even if the MC 14 receives the packet. When receiving all the data concerning one commend, the MC 14 sends the completion notice to the node 12.

To implement this, in the embodiment, the driver 24 prepares a reception packet or reception packets. The reception packet corresponds to a region of the main memory (physical address region) for receiving packets. A packet ID of the prepared reception packet is a wildcard. If the packet is transferred to the MC 14, the MC 14 confirms the packet ID of the transferred packet, receives the packet by the reception packet having the packet ID which matches the packet ID of the received packet, and stores the data in a region in the main memory 6 (physical address region) which corresponds to the reception packet. In a case where the reception packet having the packet ID which matches the packet ID of the received packet does not exist, but a reception packet having the packet ID which is a wildcard exists, the packet can be received by this packet. For this reason, the reception packet can receive any packets. The number of the prepared reception packets may be as many as possible as long as the main memory 6 (physical address region) has room.

Then, when the driver 24 of the first node requests the data of the second node, the driver 24 of the first node sends a list of the packet IDs of plural reception packets to receive the data and the lengths of data to be received by the packets. When sending the list, the MC 14 connected to the first node registers the packet ID of the reception packets in the packet management data 70 shown in FIG. 4 (sets the bit corresponding to the packet number of the packet number bit map for each TAG to "1"). The driver 24 of the second node sends the data to the first node as plural packets, based on the list. When receiving the packets, the MC 14 connected to the driver 24 of the first node sets the bit corresponding to the received packet number in the packet number bit map for each TAG to "0". When all the bits in the packet number bit map for one TAG are "0", the MC 14 deletes the TAG in the packet management data 70 and sends the completion notice to the driver 24 of the node. Thus, the frequency of an interruption of the CPU 2 of the node is lowered and the reduction in read/write efficiency is prevented.

[First Write Processing]

Figures 6A, 6B:
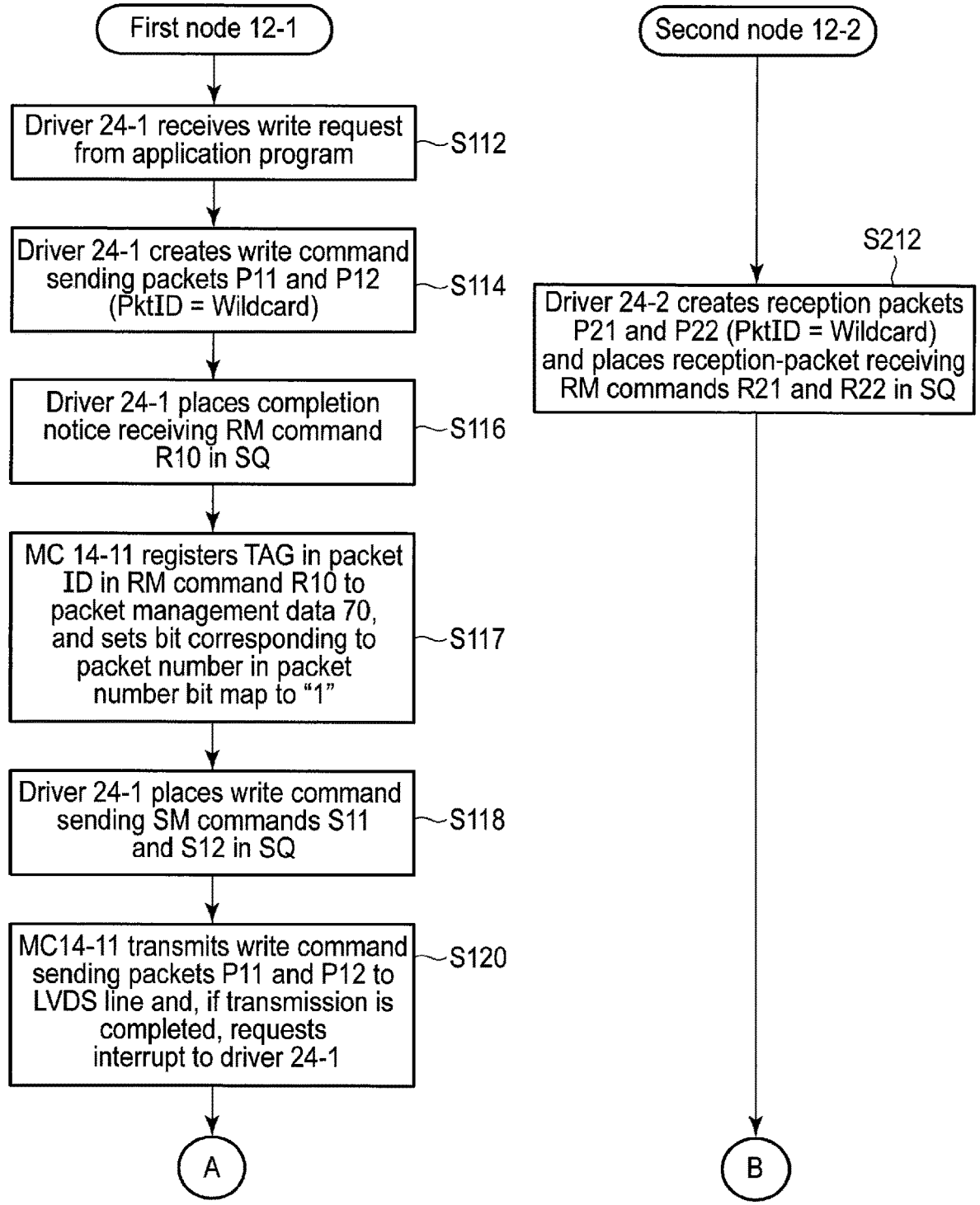
FIG. 6A and FIG. 6B are flowcharts showing a former half of an example of the first write processing.

An example of the first write processing of writing data to the storage 10-2 of the second node (node 12-2) by the first node 12-1 will be explained. FIG. 5 shows an example of packet transfer in the first write processing, and FIG. 6A and FIG. 6B and FIG. 7A and FIG. 7B are flowcharts showing an example of the write processing. FIG. 6A and FIG. 7A show processing on the first node 12-1 side, and FIG. 6B and FIG. 7B show processing on the second node 12-2 side.

First, the processing on the first node 12-1 side will be explained with reference to FIG. 6A.

In step S112, a driver 24-1 receives a write request from the application program executed by the CPU 2. The write request is for writing data in the main memory 6 (hereinafter called a virtual memory) in a virtual address region to the storage 10-2 of the second node 12-2.

In step S114, the driver 24-1 translates write data in a virtual memory M11 into write data in a data region in the main memory 6 (hereinafter called a physical memory) in a physical address region (address translation), creates a packet header (where a PktID is a wildcard), and stores the packet header in a physical memory M21. A packet having a PktID which is a wildcard can be received by the reception packet. In FIG. 5, the write data is translated into plural data items in data regions in the physical memory M21 since the physical memory M21 is assumed to be fragmented. But, if the physical memory M21 is not fragmented, the write data is translated into one data in one data region.

The driver 24-1 integrates the data and the packet header in the physical memory M21 by using SGL and creates a packet for sending the write command. Plural packets may be created for one write request in accordance with the size of the write data. An example of creating two packets P11 and P12 will be explained here.

In step S116, the driver 24-1 places NVMe command for receiving a completion notice receiving packet (Packet ID=specific ID) for the write request from the driver 24-2 of the node 12-2, i.e., Receive Message (RM) command (RM-Cmd) R10, in the SQ of the MC 14-11.

FIG. 8A and FIG. 8B show examples of a completion notice receiving packet P10 and a completion notice receiving RM command R10 for receiving the completion notice receiving packet P10. As shown in FIG. 8A, the completion notice receiving packet P10 includes an empty header region alone and does not include a payload. As shown in FIG. 8B, the completion notice receiving RM command R10 is, for example, 64 bytes data. Command Dword 0 (CDW0) of 00-03 bytes is indicative of Receive Message. The packet ID of the completion notice receiving packet P10 is set to Command Dword 10 (CDW10) and Command Dword 11 (CDW11) of 40-47 bytes. MPTR and DPTR of 16-31 bytes indicate SGL pointers of the packet. Actual SGL is in the other region. Since the completion notice receiving packet P10 is one entry of the header region alone, an SGL pointer is SGL Descriptor0. The region for receiving the completion notice receiving packet P10 is thereby reserved in the physical memory M21.

In step S117, the MC 14-11 checks whether the TAG included in the packet ID of the completion notice receiving packet P10 included in the RM command R10 in the SQ is registered in the packet management data 70 or not. If the TAG is unregistered, the MC 14-11 registers the TAG in the packet management data 70 by using the packet management module 66 and sets the bit corresponding to the packet number of the packet number bit map to "1".

In step S118, the driver 24-1 places NVMe command for sending write command sending packets P11 and P12, i.e., Send Message (SM) commands (SMCmd) S11 and S12, in the SQ of the MC 14-11.

FIG. 9A and FIG. 9B show examples of the write command sending packets P11 and P12, and the write command sending SM commands S11 and S12 for sending the write command sending packet. As shown in FIG. 9A, each of the write command sending packets P11 and P12 includes a header region and a payload. The header region includes write command information indicating that the command is a write command, packet identification information, a packet ID (=wildcard), and a packet ID of the completion notice receiving packet P10. The payload includes the write data. The write command information includes a logical address of the region of the storage 10-2 where the write data is written and a size (for example, number of sectors) of the region where the write data is written. The packet identification information includes information for identifying the command and information indicating the number of order of the packet for the command. In a case where a command is divided into plural packets, the information for identifying the command is indicative of packets belonging to the command. The above-mentioned TAG is an example of the information. For example, if write command "A" is divided into plural packets, the packet ID of the plural packets is a wildcard, and the packet identification information includes an identifier indicative of the write command "A" and the number information indicative of the number of order of the packet in the write command "A". Though not shown, the header region of the packet also includes a routing address. The routing address includes an address of the second node and the like, and is used when determining to which MC 14 in the network the packet received by the MC 14 should be transferred. The payload is, for example, 4 KiB. A wildcard packet ID is, for example, 0xFFFF FFFF FFFF FFFF.

As shown in FIG. 9B, each of the write command sending SM commands S11 and S12 for sending the write command sending packets P11 and P12 is 64 bytes data. Command Dword 0 (CDW0) of 00-03 bytes is indicative of Send Message. Since each of the write command sending packets P11 and P12 includes the header region and the payload and has at least two entries, an SGL pointer of 16-31 bytes is SGL Segment Descriptor.

In step S120, the MC 14-11 executes the command in the SQ, and sends the packet defined by the command to an adjacent MC 14 via an LVDS line. It is assumed that the write command sending packets P11 and P12 shown in FIG. 9A are sent to the driver 24-2 of the second node 12-2. The MC 14-11 generates an interrupt at the timing when the sending of the packets P11 and P12 to the LVDS line is completed, and notifies the driver 24-2 of the node 12-1 of the interruption.

The operation of the second node 12-2 will be explained. As explained above, when the system turns on, the drivers 24 of all the nodes 12 prepare the reception packets, create the packet receiving NVMe command, and place the command in the SQ. For this reason, when the system turns on, the driver 24-2 of the second node 12-2 also creates plural (two in this example) reception packets P21 and P22 which include the data item and a header, in the physical memory M22, and places the NVMe command for receiving the reception packets P21 and P22, i.e., reception packets receiving RM commands (RMCmd) R21 and R22, in the SQ of the MC 14-13, as explained in step S212 of FIG. 6B. The packet ID of the reception packets P21 and P22 is a wildcard. The driver 24-2 of the first node 12-1 also places the RM command for receiving the reception packet in the SQ of the MC 14-11 but the illustration in FIG. 6A and FIG. 7A is omitted since the command is not used in the write processing.

FIG. 10A and FIG. 10B show examples of the reception packets P21 and P22, and reception-packet receiving RM commands R21 and R22 for receiving the reception packets. As shown in FIG. 10A, each of the reception packets P21 and P22 includes a header regions and a payload. The header region is empty. The payload includes a payload header and payload data, and both of them are empty. The payload is, for example, 4 KiB.

As shown in FIG. 10B, each of the reception-packet receiving RM commands R21 and R22 is 64 bytes data. Command Dword 0 (CDW0) of 00-03 bytes is indicative of Receive Message. A wildcard packet ID (0xFFFF FFFF FFFF FFFF) is set in the packet ID of the reception packet of Command Dword 10 (CDW10) and Command Dword 11 (CDW11) of 40-47 bytes. Since the reception packet includes a header region and a payload and has at least two entries, an SGL pointer of 16-31 bytes is SGL Segment Descriptor. However, since the header region and the payload region of the reception packet are empty, the SGL pointer may be SGL Descriptor0 as one entry.

The MC 14-13 of the second node 12-2 receives the write command sending packets P11 and P12 sent from the driver 24-1 of the first node 12-1 in step S120, in step S214 in FIG. 7B.

When receiving the packets, the MC 14-13 scans the RM command in the SQ and checks whether the RM commands in which the packet ID matches that of the received packets exist or not. Since the packet ID of the write command sending packets P11 and P12 is a wildcard, the MC 14-13 detects the reception-packet receiving RM commands R21 and R22 shown in FIG. 10B. The MC 14-13 stores the header and the data of the received packets P11 and P12 in regions in the physical memory M22 which correspond to the reception packets P21 and P22.

Even if an RM command in which the packet ID matches that of the received packet does not exist, when receiving the packet, the packet can be received by an RM command in which the packet ID is a wildcard.

If the MC 14-13 receives the packet by the RM command in which the packet ID is a wildcard, the MC 14-13 immediately notifies the driver 24-2 of the node 12-2 of the completion of reception in step S215.

In step S216, the driver 24-2 integrates the data stored in the regions in the physical memory M22 which correspond to the reception packets P21 and P22, issues write command (Write Cmd) Wr20 to write the integrated data to the storage 10-2, and places the write command Wr20 in the SQ in the storage 10-2. The write command Wr20 is executed in the storage 10-2 and the data is written in the storage 10-2.

In step S217, when the storage 10-2 completes writing the data, the CQ in the storage 10-2 notifies the storage 12-2 of the completion of writing.

In step S218, the driver 24-2 creates the completion notice sending packet P20 by using the completion notice receiving packet ID designated by the write command sending packets P11 and P12 received in step S214, stores the completion notice sending packet P20 in the physical memory M22, and places the NVMe command for sending the completion notice sending packet P20, i.e., the completion notice sending SM command S20, in the SQ in the MC 14-13.

FIG. 11A and FIG. 11B show examples of the completion notice sending packet P20 and the completion notice sending SM command S20. As shown in FIG. 11A, the completion notice sending packet P20 includes a header region alone. The header region includes a write command result indicating whether the write command is successful or not and a packet ID of the completion notice sending packet. As shown in FIG. 11B, the completion notice sending SM command S20 is, for example, 64 bytes. Command Dword 0 (CDW0) of 00-03 bytes is indicative of Send Message, and MPTR and DPTR of 16-31 bytes are indicative of an SGL pointer of the packet, and the SGL pointer is SGL Descriptor® since the completion notice sending packet has one entry of the header region.

In step S220, the MC 14-13 executes the command in the SQ, and sends the packet defined by the command to an adjacent MC 14 via the LVDS line. It is assumed that the completion notice sending packet P20 shown in FIG. 11A is sent to the driver 24-1 of the first node 12-1. The MC 14-13 generates an interrupt at the timing at which the transmission of the packet P20 to the LVDS line is completed, and notifies the driver 24-2 of the node 12-2 of the interruption.

As shown in step S122 in FIG. 7A and FIG. 7B, when receiving the completion notice sending packet P20, the MC 14-11 of the first node 12-1 scans the RM command in the SQ and checks whether the RM command having the packet ID which matches that of the packets exists or not. The MC 14-11 detects the completion notice receiving RM command R10 shown in FIG. 8A and FIG. 8B. The MC 14-11 stores the header of the received completion notice sending packet P20 in a region in the physical memory M22 which corresponds to the completion notice receiving packet 210.

When storing the packet in the physical memory M22, the MC 14-11 sets the bit corresponding to the received packet number in the packet number bit map for each TAG of the packet management data 70 to "0" in step S123. When all the bits in the packet number bit map for each TAG are "0", the MC 14-13 deletes the TAG in the packet management data 70 and notifies the application program of the completion of write request. If the TAG is not registered in the packet management data 70, the completion of reception is immediately notified when receiving the packet.

The driver 24-1 may periodically check the CQ and, if the completion notice exists in the CQ, requests an interrupt to the CPU 2. Alternatively, the driver 24-1 may check the CQ when an interrupt is generated for the other reason and, if the completion notice exists in the CQ, requests an interrupt to the CPU 2. Thus, since the CPU2 is not interrupted at each transmission of one packet, the read/write processing of the CPU 2 in the node 12 is not interrupted or the processing efficiency is not lowered.

FIG. 12 shows examples of operation codes (Opcode) of NVMe commands. The operation codes are defined in 00-07 bits of Command Dword 0 (CDW0) of 00-03 bytes of the command. Data transfer is indicative of a data transfer direction, "00b" is indicative of no data transfer, "01b" is indicative of data transfer from the driver 24-2 of the node 12 to the storage 10, "10b" is indicative of data transfer from the storage 10 to the driver 24-2 of the node 12, and "11b" is indicative of bidirectional data transfer. In O/M, "O" is indicative of optional and "M" is indicative of mandatory.

Send Message includes "1b" in 07 bits, "000 00b" in 06-02 bits, and "01b" in 01-00 bits. Combined Opcode of Send Message is "81h". Command Dwords 10-15 (CDW10-CDW 15) of the SM command is reserved as shown in FIG. 9B and FIG. 11B.

Receive Message includes "1b" in 07 bits, "000 00b" in 06-02 bits, and "10b" in 01-00 bits. Combined Opcode of Receive Message is "82h". Command Dwords 10 and 11 (CDW11-CDW12) of the RM command is the packet ID or a wildcard as shown in FIG. 8B and FIG. 10B.

[First Read Processing]

Figures 14A, 14B:
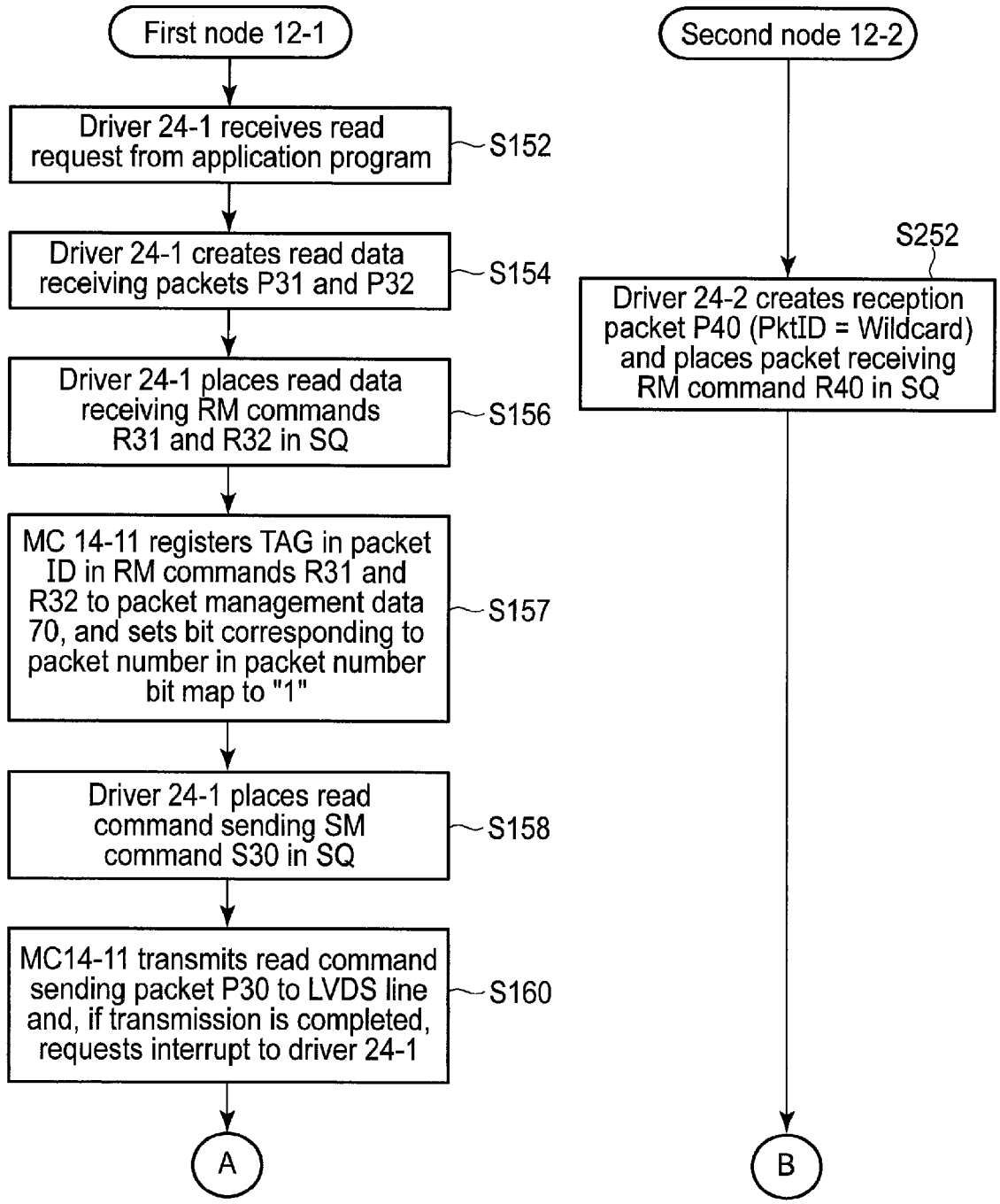
FIG. 14A and FIG. 14B are flowcharts showing a former half of an example of the first read processing.
Figures 15A, 15B:
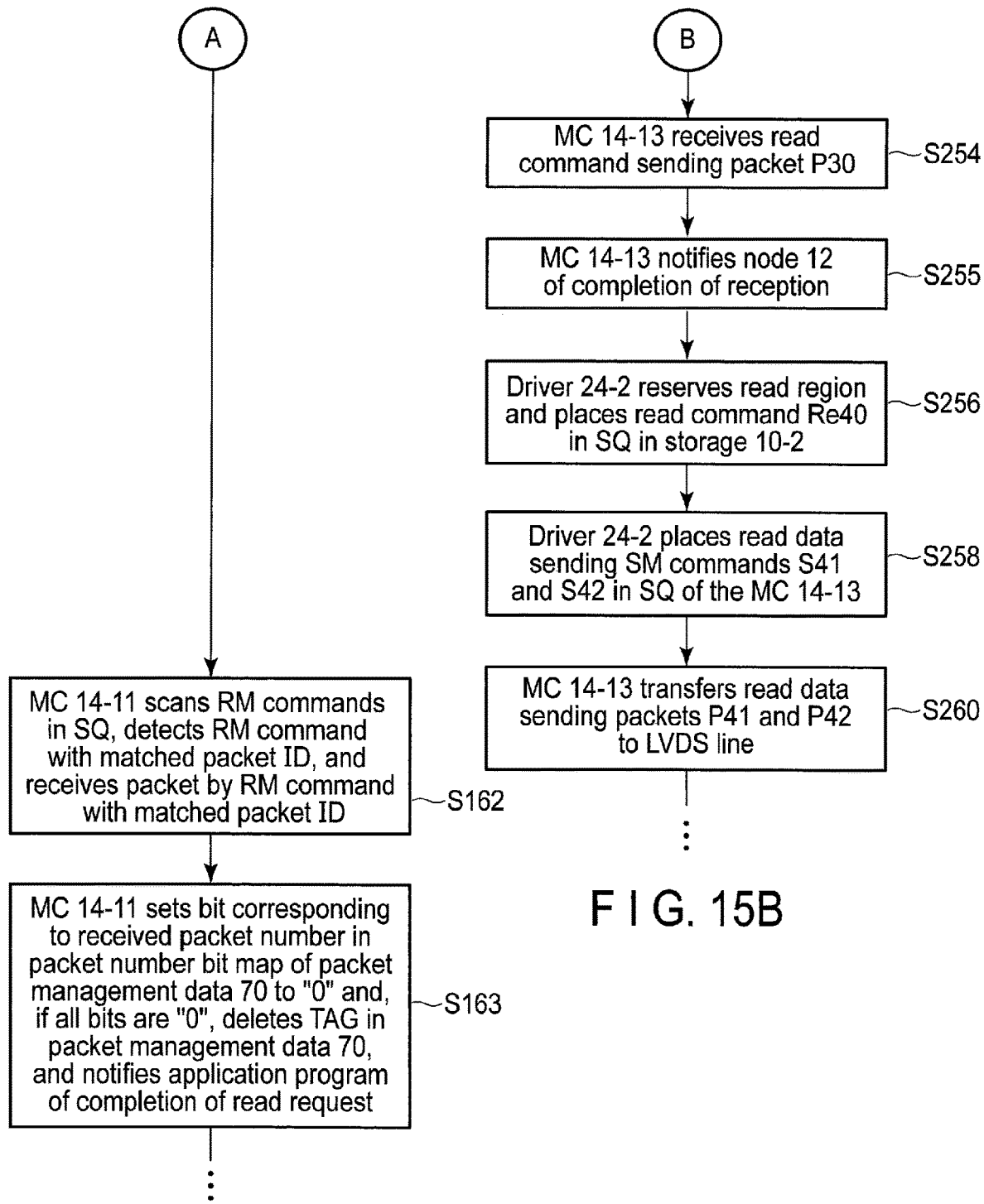
FIG. 15A and FIG. 15B are flowcharts showing a latter half of the example of the first read processing.

Next, an example of first read processing of reading data from storage 10-2 of the second node (for example, node 12-2, which may be plural second nodes) by the first node 12-1 will be explained. FIG. 13 shows an example of packet transfer in the first read processing, and FIG. 14A and FIG. 14B and FIG. 15A and FIG. 15B are flowcharts showing an example of the read processing. FIG. 14A and FIG. 15A show processing on the first node 12-1 side, and FIG. 14B and FIG. 15B show processing on the second node 12-2 side.

First, the processing on the first node 12-1 side will be explained with reference to FIG. 14A.

In step S152, the driver 24-1 receives a read request from the application program executed by the CPU 2. The read request is a request to read data in the storage 10-2 of the second node 12-2.

In step S154, the driver 24-1 translates the read data in virtual memory M11 into plural data in the physical memory M21 (address translation), to reserve the region for storing the read data in the physical memory M21, also reserves the region for the header of the packet in the physical memory M21, and creates read data receiving packets P31 and P32 for receiving the read data by integrating the header and the data by using SGL. Plural packets may be created for one read request in accordance with the size of the read data. An example of creating the two packets P31 and P32 will be explained here. In FIG. 13, the read data is received in plural data regions in the physical memory M21 since the physical memory M21 is assumed to be fragmented but, if the physical memory M21 is not fragmented, the read data is received in one data region.

In step S156, the driver 24-1 places NVMe commands for receiving the read data receiving packets P31 and P32, i.e., read data receiving RM commands (RMCmd) R31 and R32, in the SQ of the MC 14-11.

FIG. 16A and FIG. 16B show examples of the read data receiving packets P31 and P32, and the read data receiving RM commands R31 and R312 for receiving the read data receiving packets P31 and P32. As shown in FIG. 16A, each of the read data receiving packets P31 and P32 includes a header region and a payload. The header region is empty, and the payload includes empty read data. The payload is, for example, 4 KiB.

As shown in FIG. 16B, each of the read data receiving RM commands S31 and S32 is 64 bytes data. Command Dword 0 (CDW0) of 00-03 bytes is indicative of Receive Message. Since each of the reception packets P31 and P32 includes a header region and a payload and has at least two entries, an SGL pointer of 16-31 bytes is SGL Segment Descriptor. Packet IDxx of the read data sending packet is set at the packet ID of 40-47 bytes.

In step S157, the MC 14-11 checks whether the TAG included in the packet ID included in the read data receiving RM commands R31 and R32 in the SQ is registered in the packet management data 70 or not. If the TAG is unregistered, the MC 14-11 registers the TAG in the packet management data 70 by using the packet management module 66 and sets the bit corresponding to the packet number of the packet number bit map to "1".

In step S158, the driver 24-1 places NVMe command for sending read command sending packet P30, i.e., read command sending Send Message (SM) command (SMCmd) S30, in the SQ of the MC 14-11.

FIG. 17A and FIG. 17B show examples of the read command sending packet P30 and the read command sending SM command S30 for sending the read command sending packet. As shown in FIG. 17A, the read command sending packet P30 includes a header region and a payload. The header region includes read command information indicating that the command is a read command, packet identification information, and a packet ID (=wildcard). The payload includes the number of reception packet IDs (number of reception packets), and a packet ID and a data length for respective reception packets. The read command information includes a logical address of the region of the storage 10-2 where the read data is stored and a size (for example, number of sectors) of the read data. If the read command includes plural packets, the packet identification information includes an identifier indicative of the read command, and number information indicative of the number of order of the packet in the plural packets. The payload is, for example, 4 KiB at the longest. A wildcard packet ID is, for example, 0xFFFF FFFF FFFF FFFF.

As shown in FIG. 17B, the read command sending SM command S30 is 64 bytes data. Command Dword 0 (CDW0) of 00-03 bytes is indicative of Send Message. Since the read command sending packet P30 includes a header region and a payload and has at least two entries, an SGL pointer of 16-31 bytes is SGL Segment Descriptor.

In step S160, the MC 14-11 executes the command in the SQ, and sends the packet defined by the command to an adjacent MC 14 via the LVDS line. It is assumed that the read command sending packet P30 is shown in FIG. 17A is sent to the driver 24-2 of the second node 12-2. The MC 14-11 generates an interrupt at the timing at which the sending of the packet P30 to the LVDS line is completed, and notifies the driver 24-1 of the node 12-1 of an interrupt.

The operation of the second node 12-2 will be explained here. Similarly to the write processing, when the system turns on, the drivers 24 of all the nodes 12 prepare the reception packet, create the packet receiving NVMe command, and place the command in the SQ. For this reason, when the system turns on, the driver 24-2 of the second node 12-2 also places the NVMe command for receiving the reception packet P40 which includes the data and the header in the physical memory M22 and in which the packet ID is set to a wildcard, i.e., packet receiving RM command (RMCmd) R40, in the SQ of the MC 14-13, as explained in step S252 of FIG. 143. The driver 24-1 of the first node 12-1 also places the packet receiving RM command in the SQ of the MC 14-11 but the illustration in FIG. 14A and FIG. 15A is omitted since the command is not used in the read processing.

FIG. 18A and FIG. 18B show examples of reception packet P40, and NVMe command for receiving the reception packet, i.e., packet receiving RM command (RMCmd) R40. As shown in FIG. 18A, the reception packet includes a header region and a payload. The header region is empty. The payload includes a payload header and a payload data, and both of them are empty. The payload is, for example, 4 KiB. As shown in FIG. 18B, the packet receiving RM command R40 is 64 bytes data. Command Dword 0 (CDW0) of 00-03 bytes is indicative of Receive Message. A wildcard packet ID (0xFFFF FFFF FFFF FFFF) is set in Command Dword 10 (CDW10) and Command Dword 11 (CDW11) of 40-47 bytes. Since the reception packet P40 includes the header region and the payload and has at least two entries, an SGL pointer of 16-31 bytes is SGL Segment Descriptor. However, since the header region and the payload region of the reception packet are empty, the SGL pointer may be SGL Descriptor0 as one entry.

The MC 14-13 of the second node 12-2 receives the read command sending packet P30 sent from the driver 24-1 of the first node 12-1 in step S160, in step S254 in FIG. 15B.

When receiving the packet, the MC 14-13 scans the RM command in the SQ and checks whether the RM command in which the packet ID matches that of the received packet exists or not. Since the packet ID of the read command sending packet P30 is a wildcard, the MC 14-13 detects the reception packet RM command R40 shown in FIG. 18B. The MC 14-13 stores the header of the received read command sending packet P30 in a region in the physical memory M22 which corresponds to the reception packet RM command R40.

If the MC 14-13 receives the packet by the RM command in which the packet ID is a wildcard, the MC 14-13 immediately notifies the driver 24-2 of the node 12-2 of the completion of reception in step S255.

In step S256, the driver 24-2 reserves the data region for reading data in the physical memory M22, issues read command (Read Cmd) Re40 for reading data from the storage 10-2, and places the read command in the SQ in the storage 10-2. The read command is executed in the storage 10-2, and the read data is written to the physical memory M22. When the read command Re40 is completed, the completion is notified in the CQ.

In step S258, the driver 24-2 creates read data sending packets P41 and P42 by using the reception packet ID designated by the read command sending packet P30 received in step S254, places the NVMe commands for sending the read data sending packets P41 and P42, i.e., read data sending SM commands S41 and S42, in the SQ in the MC 14-13.

FIG. 19A and FIG. 19B show examples of read data sending packets P41 and P42, and read data sending SM commands S41 and S42. As shown in FIG. 19A, each the read data sending packets P41 and P42 includes a header region and a payload. The header region includes read command information, packet identification information, and a packet ID (=Packet IDxx). Since the packet ID is designated, the packet identification information is not indispensable and can be omitted. The payload includes read data and its longest size is, for example, 4 KiB. As shown in FIG. 19B, each of the read data sending SM commands S41 and S42 is 64 bytes data. Command Dword 0 (CDW0) of 00-03 bytes is indicative of Send Message. Since each of the read data sending packets P41 and P42 includes the header region and the payload and has at least two entries, an SGL pointer of 16-31 bytes is SGL Segment Descriptor.

In step S260, the MC 14-13 executes the command in the SQ, and sends the packet defined by the command to an adjacent MC 14 via the LVDS line. It is assumed that the read data sending packets P41 and P42 shown in FIG. 19A are sent to the driver 24-1 of the first node 12-1.

As shown in step S162 in FIG. 15A, when receiving the read data sending packets P41 and P42, the MC 14-11 of the first node 12-1 scans the RM command in the SQ and checks whether the RM command in which the packet ID matches that of the received packet exists or not. The MC 14-11 detects the read data receiving RM commands R31 and R32 shown in FIG. 16B. The driver 24-1 stores the headers and the data of the read data sending packets P41 and P42 in regions in the physical memory M21 which correspond to the read data receiving packets P31 and P32 of the read data receiving RM commands R31 and R32.

When storing the packet in the physical memory M21, the MC 14-11 sets the bit corresponding to the received packet number in the packet number bit map for each TAG of the packet management data 70 to "0" in step S163. When all the bits in the packet number bit map for each TAG are "0", the MC 14-11 deletes the TAG in the packet management data 70 and notifies the application program of the read request completion. If the TAG is not registered in the packet management data 70, the completion of reception is immediately notified when receiving the packet.

The driver 24-1 may periodically check the CQ and, if the completion notice exists in the CQ, requests an interrupt to the CPU 2. Alternatively, the driver 24-1 may check the CQ when an interrupt is generated for the other reason and, if the completion notice exists in the CQ, requests an interrupt to the CPU 2. Thus, since the CPU 2 is not interrupted at each transmission of one packet, the read/write processing of the CPU 2 in the node 12 is not interrupted or the processing efficiency is not lowered.

[Second Read/Write Processing]

In the first read/write processing, two types of NVMe commands, i.e., Send Message and Receive Message are used to transmit the packets. Next, an example of second read/write processing using three types of NVMe commands will be explained. In the first processing, regions for storing data of the received packet are reserved in the physical memories M21 and M22 of the node 12. In the second processing, a slot for storing management data concerning the reception packets is provided in the physical memory in the MC14. The management data concerning the reception packets includes packet ID of the packet which can be received by the slot, a pointer to the physical memories M21 and M22 in the node 12 storing the received packet, and the like.

The commands concerning the sending of the packet used in the second processing include send command RSend (Reserve Send) which reserves a slot and then sends the packet, and send command Send which sends the packet without reserving a slot.

In the second processing, the commands also include slot reserve command (Wildcard) which only reserves the slot for receiving a packet irrespective of sending the packet. The slot is required to receive the packet. A slot capable of receiving the packet in which the packet ID is set to the wildcard ID can be reserved by a slot reserve command. The slot reserve command corresponds to RM command for receiving the packet in which the packet ID is set to a wildcard ID as explained in the first read/write processing. An example of the slot reserve command (Wildcard) will be explained with reference to FIG. 20. The slot reserve command (Wildcard) is, for example, 64 bytes data. Command Dword 0 (CDW0) of 00-03 bytes is indicative of Wildcard. Metadata Pointer (MPTR) of 16-23 bytes is an SGL pointer indicative of the region of the physical memory where the header of the received packet is stored. Date Pointer (DPTR) of 24-31 bytes is an SGL pointer indicative of the region of the physical memory where the data of the received packet is stored. If the slot reserve command (Wildcard) is executed, a waiting processing for the packet is executed and packet is received by one command.

A slot reserved by executing the slot reserve command (Wildcard) is called a wildcard slot. In contrast, a slot reserved by execution of send command RSend (Reserve Send) is called a reserved slot. The reserved slot is used for sending a packet and also for receiving a packet responding to the sent packet. In contrast, the wildcard slot is a slot exclusive for receiving a packet.

Figure 21:
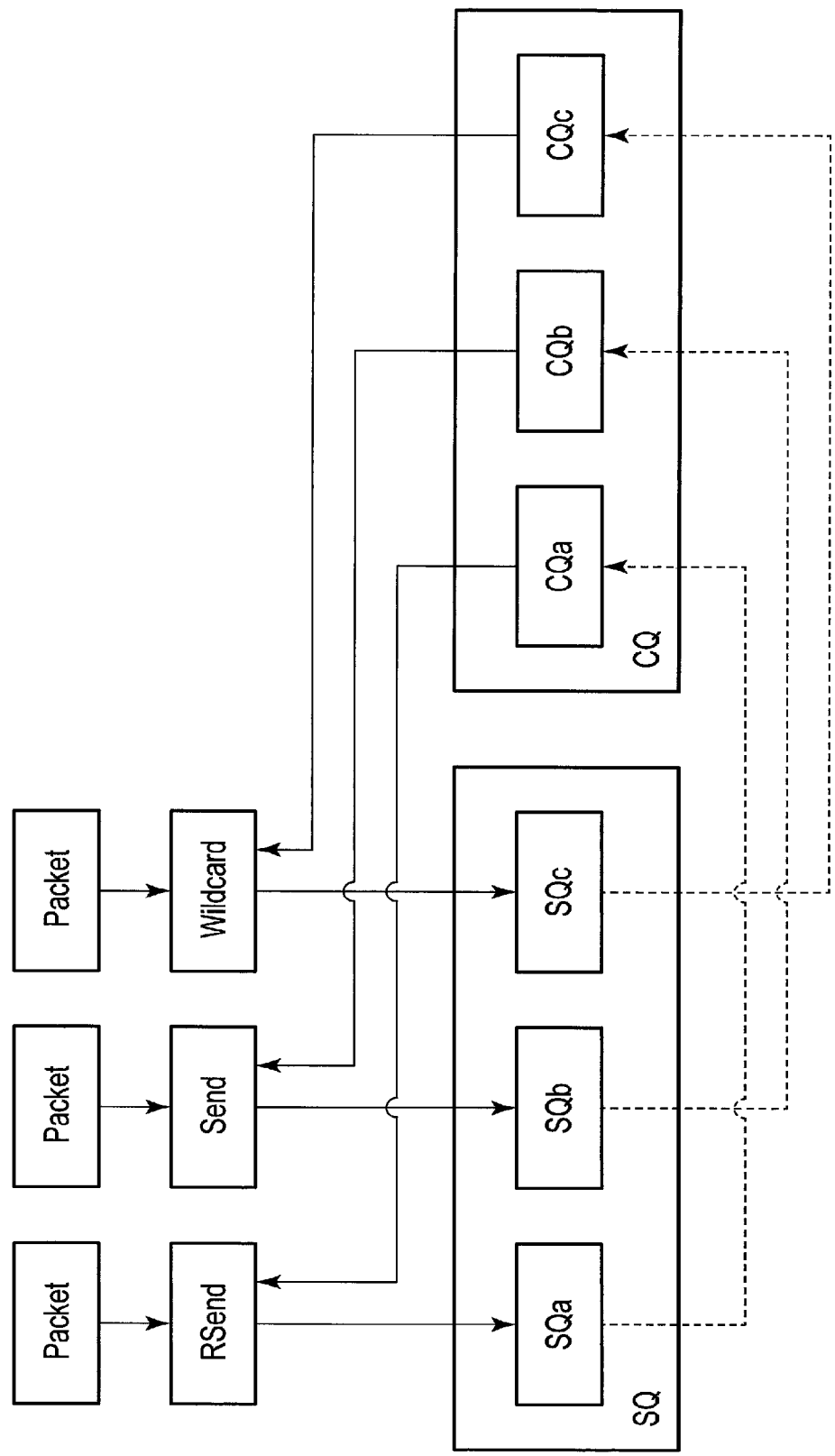
FIG. 21 is a table showing examples of queues in the second read/write processing.

FIG. 21 shows concepts of queues SQ and CQ. Queues are provided for three types of commands, respectively. The RSend command is placed in exclusive queue SQa, the Send command is also places in exclusive queue SQb, and the Wildcard command is also places in exclusive queue SQc. Three queues CQs (CQa, CQb and CQc) are also provided for three types of commands, respectively, in response to the SQa, SQb and SQc.

In a case where only one SQ exists for command execution, if plural RSend commands are placed in the SQ to reserve the slot, the Send command often cannot be placed. If the Send command cannot be placed and executed, a command may be a deadlock status between a node and another node. It is difficult to control such that a job of the Send command recently placed in one SQ is executed earlier than a job of the RSend command formerly placed in the SQ. However, if the queues SQa, SQb and SQc are provided for command types and different priorities are set to the queues SQa, SQb and SQc, the deadlock status can be prevented. Alternatively, even if the queues SQa, SQb and SQc have the same priorities, the deadlock status can be prevented if jobs of three queues are executed in a round robin method. In the first read/write processing, too, SQ and CQ shown in FIG. 5 and FIG. 13 may be provided for each of the Send Message command and the Receive Message command.

[Second Read Processing]

An example of second read processing of reading data from the storage 10-2 of the second node (for example, node 12-2, which may be plural second nodes) by the first node 12-1 will be explained with reference to FIG. 22.

First, it is assumed that when the system turns on, each node places an optional number of the Wildcard commands in the queue SQc and creates the Wildcard slots by executing these commands.

The driver 24-1 of the first node 12-1 receives a read request from the application program executed by the CPU 2. The read request is a request to read the data in the storage 10-2 of the second node 12-2.

The driver 24-1 creates a read command sending packet 302 to be sent to the wildcard slot of the MC 14-13 connected to the driver 24-2 of the node 12-2, and stores the packet 302 in the physical memory.

FIG. 23 shows an example of the read command sending packet 302, and FIG. 24 shows an example of the slot-reserving/sending command RSend for sending the packet 302 after reserving a slot. The read command sending packet 302 shown in FIG. 23 includes a header region and a payload. The header region includes a transmission destination (node 12-2) node address, a slot ID reserved by the transmission source (SL1 is registered by the MC 14-11), a transmission destination slot ID (wildcard slot), packet number information, a packet ID, command information indicating what is to be executed by the transmission destination, and the like. Since an ID of a receiving slot at the transmission destination is unknown, the transmission destination slot ID is a wildcard slot ID. It is assumed that in the transmission destination (node 12-2), a slot SL2 is empty and the packet is received by the slot SL2. A packet ID is an arbitrary ID. The node 12-2 sends a reply packet having the same packet ID as the received packet. The node 12-1 receives a packet having the same packet ID as the sent packet. When the node 12-1 sent a packet having the packet ID, the node 12-1 receives a packet having the packet ID.

The packet ID is a signature which, if the other node erroneously sends a packet to the slot SL1 of the node 12-1, prevents the slot SL1 from receiving the packet. The packet number information is indicative of the number of order of the packet in a case where plural packets sending a command exist. The command information includes a logical address of the region of the storage 10 where the data to be read is stored and a size (for example, number of sectors) of the data to be read. In the read processing, the payload is empty since the data to be sent does not exist.

FIG. 24 shows a slot-reserving/sending command RSend for sending the read command sending packet 302 and receiving read data. The slot reserve sending command RSend is, for example, 64 bytes data. Command Dword 0 (CDW0) of 00-03 bytes is indicative of Reserve Send. Metadata Pointer (MPTR) of 16-23 bytes is an SGL pointer indicative of the region of the physical memory where the header region of the packet is stored. Date Pointer (DPTR) of 24-31 bytes is an SGL pointer indicative of the region of the physical memory where the sending data is stored. Date Pointer (DPTR) of 32-39 bytes is an SGL pointer indicative of the region of the physical memory where the receiving data is stored. Command Dword 10 (CDW10) of 40-43 bytes is the number of sending packets. Command Dword 11 (CDW11) of 44-47 bytes is the number of receiving packets. Only one read command sending packet 302 exists but, since the RSend command can send or receive plural packets, the command includes the number of sent packets and the number of received packets. The SGL of the header region may be divided into that for sending packets and that for receiving packets, similarly to the SGL of the data.

The driver 24-1 sets the SGL pointer indicative of the region of the physical memory where the read command sending packet 302 shown in FIG. 23 is stored, to MPTR of 16-23 bytes of the RSend command shown in FIG. 24, sets the SGL pointer indicative of the read data receiving region to DPTR of 32-39 bytes, sets the number of read command sending packets (=1) to CDW10 of 40-43 bytes, sets the number of receiving packets corresponding to the size of the read data to CDW11 of 44-47 bytes, and places the RSend command 304 in the SQa.

The MC 14-11 reserves a slot SL1, sets "SL1" which is the ID of the reserved slot in the transmission source slot ID of the packet header, and sends the read command sending packet 302 via the LVDS line.

When the read command sending packet 302 reaches the MC 14-13 connected to the node 12-2, the MC 14-13 receives the read command sending packet 302 by an empty slot SL2 among wildcard slots designated by the transmission destination slot ID of the header region of the packet 302. The driver 24-2 of the node 12-2 places a read command for reading data from the region of the designated logical address of the storage 10-2, in the SQ (not shown) of the storage 10-2, based on the read command information of the header region of the packet 302. The driver 24-2 may read the data from the storage 10-2 without using the SQ. The storage 10-2 executes the read command so as to obtain the read data, and the read data is stored in the physical memory.

The driver 24-2 creates a header, and stores the header in the physical memory. The driver 24-2 creates a read data sending packet 306 including a header region and read data. Plural read data sending packets 306 may be created in accordance with the size of the read data.

FIG. 25 shows an example of the read data sending packet 306. FIG. 26 shows an example of the send command Send for sending the packet 306 without reserving a slot. As shown in FIG. 25, the read data sending packet 306 includes a header region and a payload. The header region includes a transmission destination (node 12-1) node address, a transmission source slot ID (undefined since the Send command does not reserve a slot), a transmission destination slot ID (reserved slot SL1), packet number information, a packet ID, command information (herein, reply to the read request), and the like. The packet ID is inherent to the packet registered and linked to the slot when reserving the slot. The packet ID stored in the read request packet is registered. The read data is included in the payload.

As shown in FIG. 26, the send command Send without reserving a slot is a command for only sending the packet. The send command Send is, for example, 64 bytes data. Command Dword 0 (CDW0) of 00-03 bytes is indicative of Send. Metadata Pointer (MPTR) of 16-23 bytes is the SGL pointer for the header region of the packet. Date Pointer (DPTR) of 24-31 bytes is the SGL pointer for the read data. Command Dword 10 (CDW10) of 40-43 bytes is indicative of the number of sending packets. Since the Send command can transmit plural packets, the command includes the number of sending packets.

The driver 24-2 sets the SGL pointer indicative of the region of the physical memory where the header region of the read data sending packet 306 shown in FIG. 25 is stored, to MPTR of 16-23 bytes of the Send command shown in FIG. 26, sets the SGL pointer indicative of the region of the physical memory where the payload of the read data sending packet 306 is stored, to DPTR of 24-31 bytes, sets the number of read data sending packets 306 to CDW10 of 40-43 bytes of the Send command, and places Send command 308 in the SQb.

The MC 14-13 sends the read data sending packet (or plural packets) 306 via the LVDS line.

When the read data sending packet 306 reaches the MC 14-11 connected to the node 12-1, the MC 14-11 receives the read data sending packet 306 by the reserved slot SL1 designated by the transmission destination slot ID of the header region of the packet 306. When the MC 14-11 detects receiving all the read data sending packets 306, based on the packet number information of the header region of the packet 306, the MC 14-11 transfers and writes the payloads of all the packets 306 to the physical memory and sends a read request completion notice to the application. The MC 14-11 may transfer the payload of the packet 306 to the physical memory every time the MC 14-11 receives each of the plural packets. In this case, too, the MC 14-11 sends the read request completion notice to the application only when the MC-11 receives all the read data sending packets 306.

[Second Write Processing]

An example of second write processing of writing data to the storage 10-2 of the second node (for example, node 12-2, which may be plural second nodes) by the first node 12-1 will be explained with reference to FIG. 27.

It is also assumed that when the system turns on, each node places an optional number of Wildcard commands in the queue SQc and creates Wildcard slots by executing these commands.

The driver 24-1 of the node 12-1 receives a write request from the application program executed by the CPU 2. The write request is a request to write data to the storage 10-2 of the second node 12-2.

The driver 24-1 creates a write reserve command sending packet 402 to be sent to a wildcard slot of the MC 14-13 connected to the node 12-2, and stores the packet 402 in the physical memory. The write reserve command sending packet 402 includes a header region alone. The header region includes a transmission destination (node 12-2) node address, a slot ID reserved by the transmission source (reserved slot SL1), a transmission destination slot ID (the wildcard slot), packet number information, a packet ID (inherent packet ID allocated to the current write request), command information (write reserve), and the like. In the write reservation processing, a payload is empty since the data to be sent does not exist.

The driver 24-1 sets the SGL pointer indicative of the region of the physical memory where the header of the write reserve command sending packet 402 is stored, to MPTR of 16-23 bytes of the RSend command shown in FIG. 24, sets the SGL pointer indicative of the region of the physical memory where the data of the receiving packet is stored, to DPTR of 32-39 bytes, sets the number of sending packets (=1) to CDW10 of 40-43 bytes, sets the number of receiving packets (=1) to CDW11 of 44-47 bytes, and places the RSend command 404 in the SQa.

The MC 14-11 reserves a slot SL1, sets "SL1" which is the ID of the reserved slot in the transmission source slot of the packet header, and sends the write reserve command sending packet 402 via the LVDS line.

When the write reserve command sending packet 402 reaches the MC 14-13 connected to the node 12-2, the MC 14-13 receives the write reserve command sending packet 402 by the slot, i.e., wildcard slot SL2, which is an empty slot of the wildcard slots designated by the transmission destination slot ID of the header region of the packet 402. The driver 24-2 of the node 12-2 executes write reservation, based on the write reserve command information of the header region of the packet 402. The write reservation is to reserve the region for storing the write data in the physical memory and to reserve a write data receiving slot.

The driver 24-2 creates a write reservation completion notice sending packet 406 to be sent to the reserved slot SL1 of the MC 14-11, and stores the packet 406 in the physical memory. The write reservation completion notice sending packet 406 includes a header region alone. The header region includes a transmission destination (node 12-1) node address, a slot ID reserved by the transmission source (SL3 set by the MC 14-13), a transmission destination slot ID (reserved slot SL1), packet number information, a packet ID, command information (write data transmission), and the like. In the write reservation completion notice processing, a payload is empty since the data to be sent does not exist.

The driver 24-2 sets the SGL pointer indicative of the region of the physical memory where the write reservation completion notice sending packet 406 is stored, to Metadata Pointer (MPTR) of 16-23 bytes of the RSend command shown in FIG. 24, sets the SGL pointer indicative of the region of the physical memory where the data of the received packet is stored, to DPTR of 32-39 bytes, sets the number of sending packets (=1) to CDW10 of 40-43 bytes, sets the number of receiving packets (=1) to CDW11 of 44-47 bytes, and places the RSend command 408 in the SQa.

The MC 14-13 reserves a slot SL3, sets "SL3" which is the ID of the reserved slot in the transmission source slot of the packet header, and sends the write reservation completion notice sending packet 406 to the destination node via the LVDS line.

When the write reservation completion notice sending packet 406 reaches the MC 14-11 connected to the node 12-1, the MC 14-11 receives the write reservation completion notice sending packet 406 by the reserved slot SL1 designated by the transmission destination slot ID of the header region of the packet 406. The driver 24-1 of the node 12-1 executes write data transmission, based on the write data send command information of the header region of the packet.

For the write data transmission, the driver 24-1 creates a write data sending packet 412 to be sent to the reserved slot SL3 of the MC 14-13, and stores the packet 412 in the physical memory. The write data sending packet 412 includes a header region and a payload. The header region includes a transmission destination (node 12-2) node address, a slot ID reserved by the transmission source (SL4 set by the MC 14-11), a transmission destination slot ID (reserved slot SL3), packet number information, a packet ID, command information (write), and the like. The command information also includes a logical address of the region of the storage 10 where the data is written. The payload is the write data. If the size of the write data is larger than the size of the payload of one packet, plural write data sending packets are created.

The driver 24-1 sets the SGL pointer indicative of the region of the physical memory where the header of the write data sending packet 412 is stored, to MPTR of 16-23 bytes of the RSend command shown in FIG. 24, sets the SGL pointer indicative of the region of the physical memory where the write data is stored, to DPTR of 24-31 bytes, sets the number of write data sending packets 412 to CDW10 of 40-43 bytes, sets the number of receiving packets (=1) to CDW 11 of 44-47 bytes, and places the RSend command 414 in the SQa.

The MC 14-11 reserves a slot SL4, stores "SL4" which is the ID of the reserved slot in the transmission source slot of the packet header, and sends the write data sending packet 412 to the destination node via the LVDS line.

When the write data sending packet 412 reaches the MC 14-13 connected to the node 12-2, the MC 14-13 receives the write data sending packet 412 by the reserved slot SL3 designated by the transmission destination slot ID of the header region of the packet 412. The driver 24-2 of the node 12-2 places a write command for writing the write data to the region of the designated logical address of the storage 10-2, in the SQ (not shown) of the storage 10-2, based on the write command information of the header region of the packet 412. The driver 24-2 may write the data to the storage 10-2 without using the SQ. The storage 10-2 executes the write command.

When the write processing of the storage 10-2 is completed, the driver 24-2 creates a write completion notice sending packet 418 to be sent to a reserved slot SL4 of the MC 14-11, and stores the packet 418 in the physical memory. The write completion notice sending packet 418 includes a header region alone. The header region includes a transmission destination (node 12-1) node address, a transmission destination slot ID (reserved slot SL4), packet number information, a packet ID, command information (completion of writing), and the like.

The driver 24-2 sets the SGL pointer indicative of the region of the physical memory where the header of the write completion notice sending packet 418 is stored, to MPTR of 16-23 bytes of the Send command shown in FIG. 26, sets the number of sending packets (=1) to CDW10 of 40-43 bytes, and places Send command 420 in the SQb.

The MC 14-13 sends the write completion notice sending packet 418 to the destination node via the LVDS line.

When the write completion notice sending packet 418 reaches the MC 14-11 connected to the node 12-1, the MC 14-11 receives the write completion notice sending packet 418 by the reserved slot SL4 designated by the transmission destination slot ID of the header region of the packet 418, and the driver 24-1 notifies the application program of the completion of write request.

[Third Write Processing]

Figure 28:
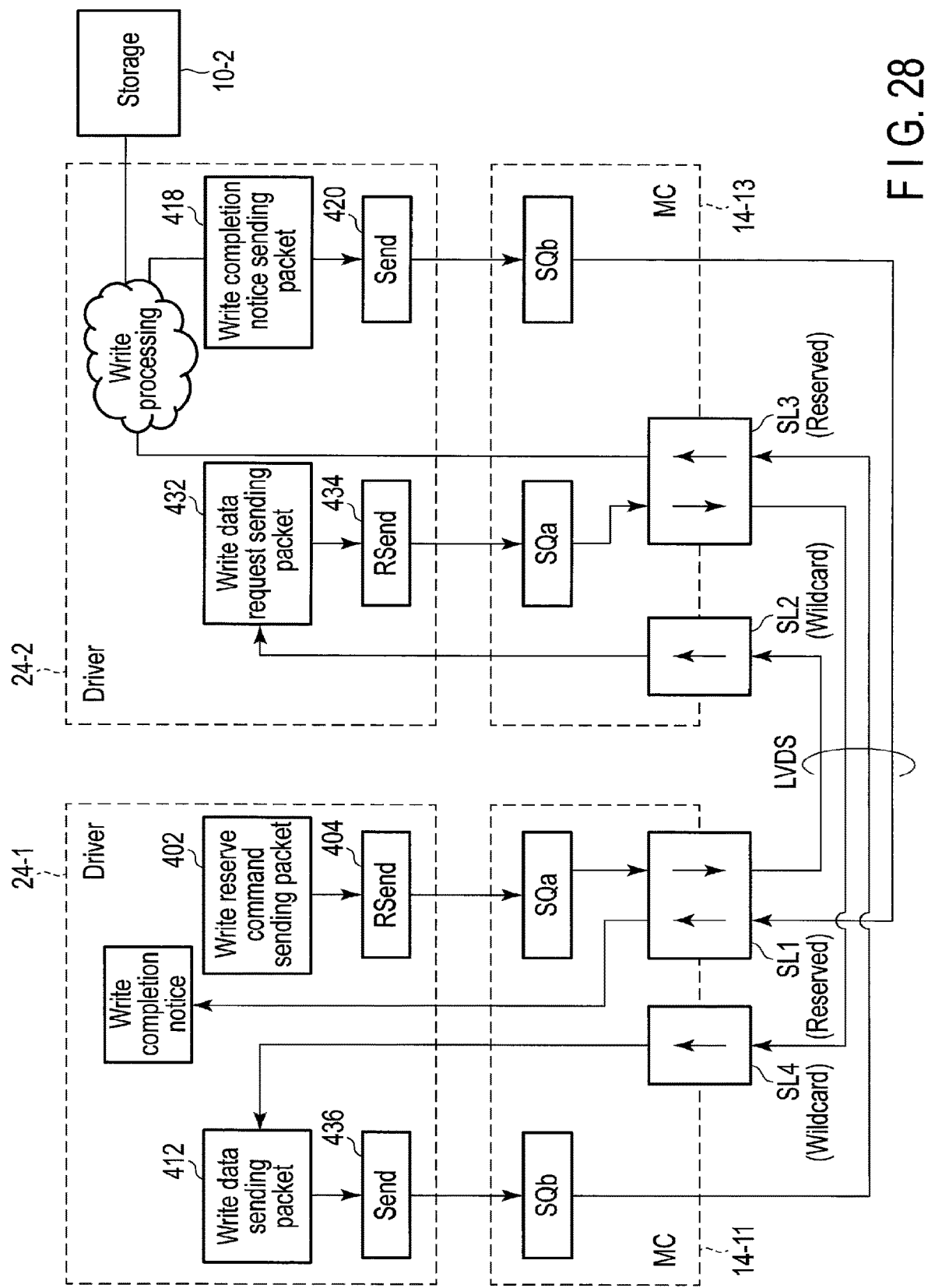
FIG. 28 is a diagram showing an example of packet transfer in the third write processing in which the driver 24-1 writes data to the storage 10-2 of the driver 24-2.

An example of third write processing of writing data to storage 10-2 of the second node (for example, node 12-2, which may be plural second nodes) by the first node 12-1 will be explained with reference to FIG. 28. The third write processing relates to a modification of the second write processing. The first node 12-1 needs to reserve two slots in the second write processing, but the first node 12-1 needs only to reserve one slot in the third write processing.

The processing until sending the write reserve command sending packet 402 from the first node 12-1 by the RSend command 404 is the same as the second write processing.

When the driver 24-2 completes the write reservation, the driver 24-2 creates a write data request sending packet 432 to be sent to a wildcard slot of the MC 14-11, and stores the packet 432 in the physical memory. The write data request sending packet 432 includes a header region alone. The header region includes a transmission destination (node 12-1) node address, a slot ID reserved by the transmission source (SL3 set by the MC 14-13), a transmission destination slot ID (wildcard slot), packet number information, packet ID, command information (write data transmission), and the like. In the write data request processing, a payload is empty since the data to be sent does not exist.

The driver 24-2 sets the SGL pointer indicative of the region of the physical memory where the write data request sending packet 432 is stored, to MPTR of 16-23 bytes of the RSend command shown in FIG. 24, sets the SGL indicative of the physical memory for receiving the write data to DPTR of 32-39 bytes, sets the number of sending packets (=1) to CDW10 of 40-43 bytes, sets the number of receiving packets corresponding to the size of the write data to CDW11 of 44-47 bytes, and places the RSend command 434 in the SQa.

The MC 14-13 reserves a slot SL3, sets "SL3" which is the ID of the reserved slot in the transmission source slot of the packet header, and sends the write data request sending packet 432 to the destination node via the LVDS line.

When the write data request sending packet 432 reaches the MC 14-11 connected to the node 12-1, the MC 14-11 receives the write data request sending packet 432 by the slot, i.e., wildcard slot SL4, which is an empty slot of the wildcard slots designated by the transmission destination slot ID of the header region of the packet 432. The driver 24-1 of the node 12-1 executes write data transmission, based on the write data send command information of the header region of the packet 432.

For the write data transmission, the driver 24-1 creates the write data sending packet 412 to be sent to the reserved slot SL3 of the MC 14-13, and stores the packet 412 in the physical memory. The write data sending packet 412 includes a header region and a payload. The header region includes a transmission destination (node 12-2) node address, a transmission destination slot ID (reserved slot SL3), packet number information, a packet ID, command information (write), and the like. The command information also includes a logical address of the region of the storage 10 where the data is to be written. The payload is the write data. If the size of the write data is larger than the size of the payload of one packet, plural write data sending packets are created.

The driver 24-1 sets the SGL pointer indicative of the region of the physical memory where the header of the write data sending packet 412 is stored, to MPTR of 16-23 bytes of the Send command shown in FIG. 26, sets the SGL pointer indicative of the region of the physical memory where the write data is stored, to DPTR of 24-31 bytes, sets the number of write data sending packets 412 to CDW10 of 40-43 bytes, and places Send command 436 in the SQb.

The MC 14-11 executes the Send command and sends the write data sending packet to the destination node via the LVDS line.

When the write data sending packet 412 reaches the MC 14-13 connected to the node 12-2, the MC 14-13 receives the write data sending packet 412 by the reserved slot SL3 designated by the transmission destination slot ID of the header region of the packet. After that, the write processing, and sending the write completion notice sending packet 412 by the Send command are executed similarly to the second write processing. However, the third write processing is different from the second write processing in that the reception of the write completion notice sending packet 418 is executed by not the second reserved slot SL4, but the reserved slot SL1 sending the write reserve command sending packet 402.

According to embodiments, following data transfer methods are provided.

(1) A data transfer method in a storage system comprising plural storages comprising a first storage and a second storage; plural controllers connected to the plural storages, the plural controllers comprising a first controller connected to the first storage; and plural packet transfer units connected to the plural controllers, the plural packet transfer units comprising a first packet transfer unit.

In the transfer method, when first data is read from the second storage, the first controller reserves a region for receiving plural first packets in a memory, the plural first packets comprising the first data; places a first command for receiving the plural first packets in a first queue of the first packet transfer unit; stores a second packet for requesting sending of the first data in the memory, and places a second command for sending the second packet in the first queue.

When the first command is received and all of the plural first packets are received, the first packet transfer unit places a completion notice of the first command in a second queue of the first packet transfer unit.

When the second command is received and sending of the second packet is completed, the first packet transfer unit places a completion notice of the second command in the second queue.

(2) The method of (1), wherein when second data is written to the second storage, the first controller reserves a region for receiving a third packet in the memory, a third packet comprising a write completion notice; places the first command for receiving the third packet in the first queue; stores plural fourth packets in the memory, the plural fourth packets comprising the second data; and places the second command for sending the plural fourth packets in the first queue.

When the first command for receiving the third packet or the plural first packets are received and the third packet or all of the plural first packets are received, the first packet transfer unit places the completion notice of the first command in the second queue.

When the second command for sending the second packet or the plural fourth packets is received and sending of the second packet or the plural fourth packets is completed, the first packet transfer unit places a completion notice of the second command in the second queue.

(3) A data transfer method in a storage system comprising plural storages comprising a first storage and a second storage; plural controllers connected to the plural storages, the plural controllers comprising a first controller connected to the first storage; and plural packet transfer units connected to the plural controllers, the plural packet transfer units comprising a first packet transfer unit.

In the transfer method, when first data is read from the second storage, the first controller stores a first packet for requesting reading of the first data in a memory; and places a first command for sending the first packet through a first slot of the first packet transfer unit in a first queue of the first packet transfer unit.

The first packet transfer unit receives a second packet comprising the first data through the first slot; and sends a completion of reading to the first controller.

(4) A data transfer method in a storage system comprising plural storages comprising a first storage and a second storage; plural controllers connected to the plural storages, the plural controllers comprising a first controller connected to the first storage; and plural packet transfer units connected to the plural controllers, the plural packet transfer units comprising a first packet transfer unit.

In the transfer method, when first data is written to the second storage, the first controller stores a first packet for reserving writing of the first data in the memory; and places a first command in a first queue of the first packet transfer unit, the first command for sending the first packet through a first slot of the first packet transfer unit.

When the first packet transfer unit receives a second packet through the first slot, the second packet for notifying a write reserve completion, the first controller stores a third packet comprising the first data in the memory, and places a third command in the queue, the third command for sending the third packet through a second slot of the of the first packet transfer unit.

When the first packet transfer unit receives a fourth packet for notifying a write completion through the second slot, the first packet transfer unit sends the write completion to the first controller.

(5) A data transfer method in a storage system comprising plural storages comprising a first storage and a second storage; plural controllers connected to the plural storages, the plural controllers comprising a first controller connected to the first storage; and plural packet transfer units connected to the plural controllers, the plural packet transfer units comprising a first packet transfer unit.

In the transfer method, when first data is written to the second storage, the first controller stores a first packet for reserving writing of the first data in the memory; and places a first command in a first queue of the first packet transfer unit, the first command for sending the first packet through a first slot of the first packet transfer unit.

When the first packet transfer unit receives a second packet comprising a write data request through the first slot, the first controller stores a third packet comprising the first data in the memory; and places a third command for sending the third packet in the queue.

When the first packet transfer unit receives a fourth packet for notifying a write completion through the first slot, the first packet transfer unit sends the write completion to the first controller.

The present invention is not limited to the embodiments described above, and the constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:

1. A storage system comprising:
plural storages comprising a first storage and a second storage;
plural controllers connected to the plural storages, the plural controllers comprising a first controller connected to the first storage; and
plural packet transfer units connected to the plural controllers, the plural packet transfer units comprising a first packet transfer unit, and
wherein
when first data is read from the second storage, the first controller is configured to
reserve a region for receiving plural first packets in a memory, the plural first packets comprising the first data,
place a first command for receiving the plural first packets in a first queue of the first packet transfer unit,
store a second packet for requesting sending of the first data in the memory, and
place a second command for sending the second packet in the first queue,
when the first command is received and all of the plural first packets are received, the first packet transfer unit is configured to place a completion notice of the first command in a second queue of the first packet transfer unit, and
when the second command is received and sending of the second packet is completed, the first packet transfer unit is configured to place a completion notice of the second command in the second queue,
when second data is written to the second storage, the first controller is configured to
reserve a region for receiving a third packet in the memory, a third packet comprising a write completion notice,
place the first command for receiving the third packet in the first queue,
store plural fourth packets in the memory, the plural fourth packets comprising the second data, and
place the second command for sending the plural fourth packets in the first queue, and
when the plural first packets are received or the first command for receiving the third packet is placed and the third packet or all of the plural first packets are received, the first packet transfer unit is configured to place the completion notice of the first command in the second queue, and
when the second command for sending the second packet is placed or the plural fourth packets are received and sending of the second packet or the plural fourth packets is completed, the first packet transfer unit is configured to place a completion notice of the second command in the second queue.

2. The storage system of claim 1, wherein
the memory comprises a physical address region of a main memory of the first controller.

3. The storage system of claim 1, wherein
the third packet comprises a header which is an empty region and a payload which is an empty region,
the fourth packet comprises a header and payload,
the header of the fourth packet comprises:
write command information;
packet identification information; and
a wildcard packet ID, and
the payload of the fourth packet comprises the second data.

4. The storage system of claim 1, wherein
the first packet transfer unit comprises bit map data,
packet numbers of the plural first packets are set to the bit map data when the first command is received,
the packet numbers set in the bit map data corresponding to the plural first packets are cleared when the plural first packets are received, and
the first packet transfer unit is configured to send a completion notice to the first controller when all of the packet numbers set in the bit map data are cleared.

5. A storage system comprising:
plural storages comprising a first storage and a second storage;
plural controllers connected to the plural storages, the plural controllers comprising a first controller connected to the first storage; and
plural packet transfer units connected to the plural controllers, the plural packet transfer units comprising a first packet transfer unit, and
wherein
when first data is read from the second storage, the first controller is configured to
reserve a region for receiving plural first packets in a memory, the plural first packets comprising the first data,
place a first command for receiving the plural first packets in a first queue of the first packet transfer unit,
store a second packet for requesting sending of the first data in the memory, and
place a second command for sending the second packet in the first queue,
when the first command is received and all of the plural first packets are received, the first packet transfer unit is configured to place a completion notice of the first command in a second queue of the first packet transfer unit, and
when the second command is received and sending of the second packet is completed, the first packet transfer unit is configured to place a completion notice of the second command in the second queue,
each of the plural first packets comprises a header which is an empty region and a payload which is an empty region, and
the second packet comprises a header and payload;
the header of the second packet comprises:
read command information,
packet identification information, and
a wildcard packet ID, and
the payload of the second packet comprises:
a total number of the plural first packets,
a packet ID of each of the plural first packets, and
a data length of each of the plural first packets.

6. The storage system of claim 5, wherein
the memory comprises a physical address region of a main memory of the first controller.

7. The storage system of claim 5, wherein
the third packet comprises a header which is an empty region and a payload which is an empty region,
the fourth packet comprises a header and payload,
the header of the fourth packet comprises:
write command information;
packet identification information; and a wildcard packet ID, and
the payload of the fourth packet comprises the second data.

8. The storage system of claim 5, wherein
the first packet transfer unit comprises bit map data,
packet numbers of the plural first packets are set to the bit map data when the first command is received,
the packet numbers set in the bit map data corresponding to the plural first packets are cleared when the plural first packets are received, and
the first packet transfer unit is configured to send a completion notice to the first controller when all of the packet numbers set in the bit map data are cleared.

9. A storage system comprising:
plural storages comprising a first storage and a second storage;
plural controllers connected to the plural storages, the plural controllers comprising a first controller connected to the first storage; and
plural packet transfer units connected to the plural controllers, the plural packet transfer units comprising a first packet transfer unit, and
wherein
when first data is written to the second storage, the first controller is configured to
store a first packet for reserving writing of the first data in the memory, and
place a first command in a first queue of the first packet transfer unit, the first command for sending the first packet through a first slot of the first packet transfer unit,
when the first packet transfer unit receives a second packet for notifying a write reservation completion through the first slot or a second packet comprising a write data request through a second slot of the first packet transfer unit, the first controller is configure to
store a third packet comprising the first data in the memory, and
place a third command in the queue, the third command for sending the third packet, and
when the first packet transfer unit receives a fourth packet for notifying a write completion through the first slot or the second slot, the first packet transfer unit is configured to send the write completion to the first controller.

10. The storage system of claim 9, wherein
when the first packet transfer unit receives the second packet for notifying the write reservation completion through the first slot, the first controller is configure to
store the third packet comprising the first data in the memory, and
place the third command in the queue, the third command for sending the third packet through the second slot, and
when the first packet transfer unit receives the fourth packet for notifying the write completion through the second slot, the first packet transfer unit is configured to send the write completion to the first controller.

11. The storage system of claim 10, wherein
the memory is a physical address region of a main memory of the first controller.

12. The storage system of claim 9, wherein
when the first packet transfer unit receives the second packet comprising the write data request through the second slot, the first controller is configure to
store the third packet comprising the first data in the memory, and
place the third command for sending the third packet in the queue, and
when the first packet transfer unit receives the fourth packet for notifying the write completion through the first slot, the first packet transfer unit is configured to send the write completion to the first controller.

13. The storage system of claim 12, wherein
the memory comprises a physical address region of a main memory of the first controller.

* * * * *